(12) United States Patent
Miklós et al.

(10) Patent No.: US 10,892,945 B2
(45) Date of Patent: Jan. 12, 2021

(54) INDUSTRY AUTOMATION APPARATUS WITH REDUNDANT CONNECTIVITY TO A COMMUNICATION NETWORK AND CONTROLLERS THEREFOR

(71) Applicant: Telefonaktiebolaget LM Ericsson (publ), Stockholm (SE)

(72) Inventors: György Miklós, Pilisborosjenő (HU); János Harmatos, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 99 days.

(21) Appl. No.: 16/071,251

(22) PCT Filed: Feb. 10, 2016

(86) PCT No.: PCT/EP2016/052794
§ 371 (c)(1),
(2) Date: Jul. 19, 2018

(87) PCT Pub. No.: WO2017/137075
PCT Pub. Date: Aug. 17, 2017

(65) Prior Publication Data
US 2019/0280926 A1    Sep. 12, 2019

(51) Int. Cl.
*H04L 12/24* (2006.01)
*H04W 48/18* (2009.01)
(Continued)

(52) U.S. Cl.
CPC ...... *H04L 41/0823* (2013.01); *H04L 41/0806* (2013.01); *H04W 48/00* (2013.01);
(Continued)

(58) Field of Classification Search
CPC ........ G05B 19/054; G05B 2219/14127; G05B 2219/1135; H04L 41/0823; H04L 41/0806; H04W 48/18
See application file for complete search history.

(56) References Cited

U.S. PATENT DOCUMENTS 6,236,334 B1    5/2001  Tapperson et al.
2012/0071200 A1*  3/2012  Bienas ............... H04W 48/20
                                                  455/525
(Continued)

FOREIGN PATENT DOCUMENTS

EP        1734694 A1    12/2006
EP        2171924 B1    12/2012
WO    WO2014146290 A1 *  9/2014  ............. H04L 12/24

OTHER PUBLICATIONS

Kim, A. et al., "When HART Goes Wireless: Understanding and Implementing the WirelessHART Standard", IEEE International Conference on Emerging Technologies and Factory Automation, Sep. 15, 2008, pp. 899-907, IEEE.

*Primary Examiner* — Samina F Choudhry
(74) *Attorney, Agent, or Firm* — Coats + Bennett, PLLC

(57) ABSTRACT

A technique for providing a redundant network connection for an industry automation apparatus is provided. In one aspect of the present disclosure, a network controller is provided that is configured to control a redundant connection of the industry automation apparatus via a communication network to another apparatus. The industry automation apparatus has a first radio interface and a second radio interface. The communication network comprises two or more functionally equivalent network entities grouped in a first entity set and a second network entity set disjoint to the first network entity set, wherein the first network entity set and the first radio interface are associated with a first redundancy group and wherein the second network entity set (Continued)

and the second radio interface are associated with a second redundancy group.

19 Claims, 16 Drawing Sheets

(51) Int. Cl.
 *H04W 48/20* (2009.01)
 *H04W 48/00* (2009.01)
 *G05B 19/05* (2006.01)

(52) U.S. Cl.
 CPC ........... *H04W 48/18* (2013.01); *H04W 48/20* (2013.01); *G05B 19/054* (2013.01); *G05B 2219/1135* (2013.01); *G05B 2219/14127* (2013.01)

(56) References Cited

U.S. PATENT DOCUMENTS

2017/0093159 A1* 3/2017 Siessegger ............. G05B 15/02
2019/0007884 A1* 1/2019 Koskinen ............. H04W 36/30

\* cited by examiner

INDUSTRY AUTOMATION APPARATUS WITH REDUNDANT CONNECTIVITY TO A COMMUNICATION NETWORK AND CONTROLLERS THEREFOR

TECHNICAL FIELD

The present disclosure generally relates to industry automation. In particular, a technique for establishing and controlling a redundant connection of an industry automation apparatus having a first radio interface and a second radio interface is described. The technique may be implemented in the form of apparatuses, controllers, systems, methods and computer programs.

BACKGROUND

Industry automation covers a wide range of deployments for the automation of various industrial processes, from pure plant measurement to high precise motion control in a robotized factory cell. Due to the wide range of possible use cases, industry automation is a continuously expanding area in which more and more complicated tasks and processes are taken over by high-precision robots and automatized devices deployed in a factory cell or in a complex assembly line.

To permit a precise control of industry devices by centralized controllers, the two most important requirements of industry automation are low latency (which could be extremely low, around 1 ms in several use cases, such as laser cutting) and high reliability (which requires fast and robust fault-handling solutions). Evidently, the low latency is important in case of timing critical use cases, but the high redundancy/fast switchover time in case of a failure could be a basic requirement in a much wider range of industrial use cases. Outage of any industry process or system due to a failure causes revenue losses, but unhandled failure situations could mean damages in industry devices or in the products, or in extreme cases even human injury.

To sum up, reliability and fault handling is an important aspect in industry automation, especially in such use cases in which time critical processes are performed. In such use cases even a short communication problem could have a significant impact on the system performance.

Currently, industrial use cases with high latency and redundancy requirements are implemented using wired field networks. At present, several specific fieldbus technologies are available (e.g., Modbus and PROFIBUS), but the solution dominating the industry automation market is PROFINET. PROFINET is an open, cross-vendor standard (defined in IEC 61158, IEC 61784) for industry automation. It provides compatibility with Ethernet (according to IEEE standards) and supports a wide range of Ethernet-based communication services in an integrated way from extremely fast control data transmission between the controller (also called Programmable Logical Unit, PLC) and the field device to Transmission Control Protocol/Internet Protocol (TCP/IP)-based communication. PROFINET also supports real-time and Isochronous Real-Time (IRT) communication between PLC and field devices using a cycle-based, pre-planned communication among the devices.

In order to provide redundancy, a fault-tolerant (double connected) network topology can be used, which makes it possible to provide at least two independent network connections in terms of working and protection paths between the industry automation apparatuses (e.g., between the PLC and the Input-Output, IO, devices). PROFINET provides different redundancy solutions according to the required switchover time. For the less critical applications, the Rapid Spanning Tree Protocol (RSTP, according to IEEE 802.1D) can be used, which provides a path reconfiguration time for a ring structure in the order of a few 100 ms.

In some use cases, the few 100 ms order of switchover time is not acceptable. Therefore, an optimized redundancy solution was developed for PROFINET. This is the Media Redundancy Protocol (MRP), which provides less than 200 ms failover time on a ring topology. The essence of the redundancy approach is the usage of a Redundancy Manager (RM) node with two ports that face in opposite directions. In normal operation, one of the two ports is blocked for data transmission. This results in a logical line topology on top of the physical ring, as illustrated on the left-hand side of FIG. 1.

It is also the task of the RM node to continuously check the physical ring by sending out test frames on one port and check them on the opposite one. If one link in the ring fails, then the RM detects loss of test frames and switches its blocked port to forwarding mode as shown on the right-hand side of FIG. 1. In this way another logical line topology is formed, which does not contain the failed link. Then, the RM informs the involved nodes to update their internal address table in order to use the new communication path. In some cases the RM node is integrated in the controller of the industry automation system.

In highly time-critical case (typically for IRT use cases), the Media Redundancy for Planned Duplication (MRPD) protocol can be used, which is a 1+1 protection scheme: the data is sent out on two independent communication paths (e.g., in both directions in case of a ring topology) as illustrated on the left-hand side of FIG. 2. In such a scenario, there is no switchover time in case of a failure (see sight-hand side of FIG. 2). Both the duplicated transmission and the receiving of the data frames on two paths may be managed by PROFINET by using proper configurations.

The 5th Generation (5G) of mobile Radio Access Technologies (RATs) is a candidate to support much wider range of the different services than current mobile systems. It is expected that a rich set of use cases will be supported, including also various industry automation cases. The new 5G radio interface is expected to use much shorter Transmission Time Intervals (TTIs) than the radio interface of the 4G RAT Long Term Evolution (LTE), resulting in significantly less round-trip time on the radio interface. The 5G radio interface will thus be able to support even those industrial use cases that require an extremely low latency (~1-10 ms). However, as has been mentioned earlier, the short round-trip time is only one important factor, the other one is the high reliability, which needs to be supported also by the 5G infrastructure.

Today's mobile networks do not provide any explicit redundancy features for the failure of network entities such as Base Stations (BSs). Some redundancy may at most be provided by overlapping coverage areas of multiple BSs. Such overlap may be present, e.g., due to the parallel coverage of 2G, 3G and 4G RATs. Also, duplicate coverage may be present due to large umbrella cells in addition to smaller cells deployed for capacity reasons. However, using such duplicated RAN coverage and relying on the terminal device, also called User Equipment (UE), to detect the failure of the BS leads to rather long switchover times (even seconds) due to the time needed for the UE to detect the failure of a BS and to find another available cell. Also, failure of the UE is presently not handled. While duplicated coverage is thus possible in the existing mobile networks, the main motivation for it is typically not to provide redundancy, but to improve coverage, support high traffic volumes, and so on.

Another redundancy concept is known from heterogeneous networks. In such networks, micro/pico BSs are deployed in additional to macro coverage in order to increase the performance from a capacity or coverage point of view. A UE normally connects to a close, high-capacity BS, but if this node fails it is possible to connect to a BS further away. There is no guarantee, however, that the new BS can provide the same performance as the old one. For example, latency of a 3G network is about 30% higher than that of an LTE network. So if in case of an LTE BS failure only 3G coverage is available the UE can establish a network connection, but it may happen that the latency is not sufficiently low for new industry automation purposes.

SUMMARY

There is a need for a solution that efficiently provides a redundant network connection for an industry automation apparatus.

According to a first aspect a network controller is provided that is configured to control a redundant connection of an industry automation apparatus having a first radio interface and a second radio interface via a communication network to another apparatus, wherein the communication network comprises two or more functionally equivalent network entities grouped in a first network entity set and a second network entity set disjoint to the first network entity set. The first network entity set and the first radio interface are associated with a first redundancy group and the second network entity set and the second radio interface are associated with a second redundancy group. The network controller is configured to connect the first radio interface, in response to determining that the first radio interface belongs to the first redundancy group, via the first network entity set to the other apparatus. The network controller is further configured to connect the second radio interface, in response to determining that the second radio interface belongs to the second redundancy group, via the second network entity set and in parallel to the first radio interface to the other apparatus.

The network controller may be located at any logical position within the communication network. As an example, the network controller may belong to a radio access network part, a transport network part, or a core network part of the communication network. Additionally, or in the alternative, the network controller may be integrated in or may be co-located with any network entity (e.g., of any particular network entity set). As an example, the network controller may be integrated in or co-located with a radio access network entity, such as a BS.

There may exist one, two or more types of functionally equivalent network entities in each network entity set. As first type of functionally equivalent network entities may belong to a radio access network entity type (e.g., a BS). A second type of functionally equivalent network entities may belong to a transport network entity type. A third type of functionally equivalent network entities may belong to a core network entity type (e.g., a particular type of gateway node).

The network controller of the industry automation device may further be adapted to dynamically configure the first network entity set and the second network entity set. The dynamic configuring may comprise dynamically reducing the redundancy by connecting the first radio interface and the second radio interface via the same first network entity or the same second network entity to the other apparatus (e.g., in response to a network entity failure). It should be noted that such a sharing of a particular network entity may only pertain to a particular network entity type, such as an access network entity type. Other network entity types within the first network entity set and the second entity set may still remain operable, so that at least a certain degree of redundancy will remain.

The network controller may further be configured to determine that the first radio interface belongs to the first redundancy group and that the second radio interface belongs to the second redundancy group based on an order in which the first radio interface and the second radio interface connect to the communication network. For example, the first redundancy group may be associated with the particular radio interface first connecting to the network, and the second redundancy group may be associated with the other radio interface that connects to the network at a later point in time.

The network controller may further be configured to determine that the first radio interface belongs to the first redundancy group and that the second radio interface belongs to the second redundancy group based on one or more of:
- a first grouping parameter associated with the first redundancy group and signalled by the first radio interface and a second grouping parameter associated with the second redundancy group and signalled by the second radio interface;
- a network identifier associated with the first radio interface and the second radio interface, respectively;
- a cell selection scheme that defines cells selectable or not selectable by a particular radio interface for being connected to the communication network;
- first and second Closed Subscriber Groups, CSGs, associated with the first radio interface and the second radio interface, respectively.

The network controller may further be configured to assign the network entities to the network entity sets. To this end, the network controller may further comprise an Operation & Maintenance, O & M, function configured to perform the assignment of the network entities to the network entity sets.

According to a second aspect an industry automation apparatus is provided that is configured to be redundantly connected via a communication network to another apparatus, wherein the communication network comprises two or more functionally equivalent network entities grouped in a first network entity set and a second network entity set disjoint to the first network entity set. The industry automation apparatus comprises a first radio interface configured to connect to the communication network, wherein the first network entity set and the first radio interface are associated with a first redundancy group, and a second radio interface configured to connect to the communication network in parallel to the first radio interface, wherein the second network entity set and the second radio interface are associated with a second redundancy group. The apparatus further comprises at least one controller configured to control the first radio interface to be connected via the first network entity set to the other apparatus and to control the second radio interface to be connected via the second network entity set to the other apparatus.

The industry automation apparatus may be any apparatus that automates an industrial process. As an example, the industry automation apparatus may be an automated manufacturing device, such as a robot or any other manufacturing machine.

The at least one controller may be configured to control the first radio interface to signal to the communication network a first grouping parameter associated with the first redundancy group, and to control the second radio interface to signal to the communication network a second grouping parameter associated with the second redundancy group. In one variant the first grouping parameter is one of defined by and derived from a network identifier associated with the first radio interface. In a similar manner the second grouping parameter may be one of defined by and derived from a network identifier associated with the second radio interface, respectively. The network identifier may take the form of an International Mobile Subscriber Identity (IMSI) or an International Mobile Equipment Identity (IMEI) associated with the respective radio interface.

In all the aspects described herein, a first Closed Subscriber Group, CSG, may be associated with the first redundancy group. A second CSG may be associated with the second redundancy group. Information associating a particular radio interface with a particular CSG may be centrally stored in a core network part of the communication network. This information may be exploited by the network controller for determining that a particular radio interface belongs to a particular redundancy group (and thus to a particular CSG).

In all the aspects described herein, the first network entity set may comprise one of one or more first cells and one or more first base stations defining the first cells. In a similar manner the second network entity set may comprise one of one or more second cells and one or more second base stations defining the second cells. In such a case, the at least one controller of the industry automation apparatus may be configured to control the first radio interface and the second radio interface on the basis of a cell selection scheme that defines cells selectable or not selectable by a particular radio interface for being connected to the communication network.

The industry automation apparatus may further be configured to receive, from the first network entity set, first control information indicative of the first network entity set belonging to the first redundancy group, and to receive, from the second network entity set, second control information indicative of the second network entity set belonging to the first redundancy group. The at least one controller of the industry automation apparatus may be configured to control the first radio interface based on the received first control information to be connected via the first network entity set, and to control the second radio interface based on the received second control information to be connected via the second network entity set. Such control may include triggering the respective radio interface to transmit the respective control information when connecting to the communication network.

In all the aspects described herein, the cell selection scheme may based on Tracking Areas, TAs. Specifically, the at least one controller of the industry automation apparatus may be configured to control the first radio interface and the second radio interface on the basis of control information defining TAs not selectable for the respective radio interface.

The at least one controller of the industry automation apparatus may further be configured to dynamically control the first radio interface to be connected via the second network entity set to the other apparatus, or to control the second radio interface to be connected via the first network entity set to the other apparatus. The at least one controller may be configured to perform that dynamic control based on an assessment of one or more metrics. Such one or more metrics may relate to one or more of a link quality between a particular radio interface and a particular access network entity, cell load measurements, and so on.

The industry automation apparatus may further be configured to receive third control information associating the first radio interface with the first redundancy group and to receive fourth control information associating and the second radio interface with the second redundancy group. In such a case, the at least one controller of the industry automation device may be configured to control the first radio interface based on the received third control information to be connected via the first network entity set, and to control the second radio interface based on the received fourth control information to be connected via the second network entity set.

The at least one controller of the industry automation device may further be configured to select a network entity from the first network entity set and a network entity from the second network entity set for the first radio interface and the second radio interface, respectively, based on one or more metrics. Several exemplary metrics have been discussed above and will be discussed below.

In all the aspects described herein, the first network entity set may comprise at least one of one or more first radio access network entities, one or more first transport network entities and one or more first core network entities. In a similar manner, the second network entity set may comprise at least one of one or more second radio access network entities, one or more second transport network entities and one or more second core network entities. The one or more first and second core network entities may each include at least one of one or more user plane entities and one or more control plane entities In the industry automation apparatus, the first radio interface and the second radio interface may share one Subscriber Identity Module, SIM. Alternatively, the first radio interface and the second radio interface may each have a dedicated Subscriber Identity Module, SIM.

In all the aspects described herein, the first network entity set and the second network entity set may be configured to be shared by multiple industry automation apparatuses.

According to a still further aspect, an industry automation system is provided that comprises the industry automation apparatus as described above and as generally described herein, and the other apparatus, wherein the other apparatus comprises a third interface configured to be connected to the first radio interface of the industry automation apparatus and a fourth interface configured to be connected to the second radio interface of the industry automation apparatus.

The other apparatus may be a further industry automation apparatus as described above and as generally described herein. In such a case, the third interface is a third radio interface and the fourth interface is a fourth radio interface. Alternatively, the other apparatus is a proxy component configured to interface between the industry automation apparatus and one of a network server and an industry automation apparatus without redundant connectivity.

According to another aspect, a handover controller is provided configured to handover an industry automation apparatus redundantly connected via a first radio interface and a second radio interface of the industry automation apparatus and a via a communication network to another apparatus, wherein the communication network comprises two or more functionally equivalent network entities grouped in a first network entity set and a second network entity set disjoint to the first network entity set. The first network entity set and the first radio interface are associated with a first redundancy group and the second network entity set and the second radio interface are associated with a second redundancy group. The handover controller is configured to determine, for a handover of the first radio interface from a current first network entity, a potential new first network entity from the first network entity set.

The handover controller may further be configured to determine that no potential new first network entity from the first network entity set can be found. In such a case it may select a network entity not included in the first network entity set for the handover. The selected network entity may belong to the second network entity set.

Determining that no new first entity can found may be based on an assessment of one or more metrics. The one or more metrics may relate to a link quality from a respective radio interface to a respective radio access network entity or other parameters. Moreover, the handover controller may further be configured to perform the assessment on the basis of one or more configurable metric thresholds.

According to another aspect, a method of controlling a redundant connection of an industry automation apparatus having a first radio interface and a second radio interface via a communication network to another apparatus is presented. The communication network comprises two or more functionally equivalent network entities grouped in a first network entity set and a second network entity set disjoint to the first network entity set, wherein the first network entity set and the first radio interface are associated with a first redundancy group and wherein the second network entity set and the second radio interface are associated with a second redundancy group. The method is performed by a network controller and comprises connecting the first radio interface, in response to determining that the first radio interface belongs to the first redundancy group, via the first network entity set to the other apparatus, and connecting the second radio interface, in response to determining that the second radio interface belongs to the second redundancy group, via the second network entity set in parallel to the first radio interface to the other apparatus.

The above method may further comprise operating the network controller according to any of the network controller aspects described herein.

According to a still further aspect, a method of redundantly connecting an industry automation device via a communication network to another apparatus is described. The communication network comprises two or more functionally equivalent network entities grouped in a first network entity set and a second network entity set disjoint to the first network entity set, and the industry automation device comprises a first radio interface configured to connect to the communication network, wherein the first network entity set and the first radio interface are associated with a first redundancy group, and a second radio interface configured to connect to the communication network in parallel to the first radio interface, wherein the second network entity set and the second radio interface are associated with a second redundancy group. The method is performed by the industry automation apparatus and comprises controlling the first radio interface to be connected via the first network entity set to the other apparatus, and controlling the second radio interface to be connected via the second network entity set to the other apparatus.

The above method may further comprise operating the industry automation apparatus according to any of the industry automation apparatus aspects described herein.

According to another aspect, a method of performing a handover of an industry automation apparatus redundantly connected via a first radio interface and a second radio interface of the industry automation apparatus and via a communication network to another apparatus is presented. The communication network comprises two or more functionally equivalent network entities grouped in a first network entity set and a second network entity set disjoint to the first network entity set, wherein the first network entity set and the first radio interface are associated with a first redundancy group and wherein the second network entity set and the second radio interface are associated with a second redundancy group. The method is performed by the handover controller and comprises determining, for a handover of the first radio interface from a current first network entity, a potential new first network entity from the first network entity set.

The above method may further comprise operating the handover controller according to any of the handover controller aspects described herein.

Also provided is a computer program product comprising program code portions to perform the steps of any of the methods and method aspects presented herein when the computer program product is executed on one or more processing devices. The computer program product may be stored on one or more computer-readable recording media, such as semiconductor memories, CD-ROMS, DVDs, and so on. The computer program product may be distributed among various components of a base station system.

BRIEF DESCRIPTION OF THE DRAWINGS

Further aspects, details and embodiments of the present disclosure will now be described in more detail with reference to the drawings, wherein.

DETAILED DESCRIPTION

In the following description, for purposes of explanation and not limitation, specific details are set forth, such as specific network environments, in order to provide a thorough understanding of the technique disclosed herein. It will be apparent to one skilled in the art that the technique may be practiced in other embodiments that depart from these specific details.

Moreover, while the following embodiments are primarily described for Long Term Evolution (LTE) and 5G implementations, it is readily apparent that the technique described herein may also be implemented in any other wireless communication network, including a Wireless Local Area Network (WLAN) according to the standard family IEEE 802.11 (e.g., IEEE 802.11a, g, n or ac; also referred to as Wi-Fi) and/or a Worldwide Interoperability for Microwave Access (WiMAX) according to the standard family IEEE 802.16.

Those skilled in the art will appreciate that the services, functions, steps and units explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the services, functions, steps and implement the units disclosed herein.

With the embodiments described in more detail below, a highly reliable mobile system is realized which can provide two at least partially independent network connections between industry automation devices (or between an industry automation apparatus and another apparatus such as a network server). This reliability is supported by defining disjoint redundancy groups for the networking entities. By having networking entities in more than one redundancy group, redundancy can be achieved which provides protection against failures. The redundant network connections may comprise a working connection (or working path) that is used for regular communication and a protection connection (or protection path) that is established in parallel to the working connection and used for communication in case of a failure.

Figure 3:
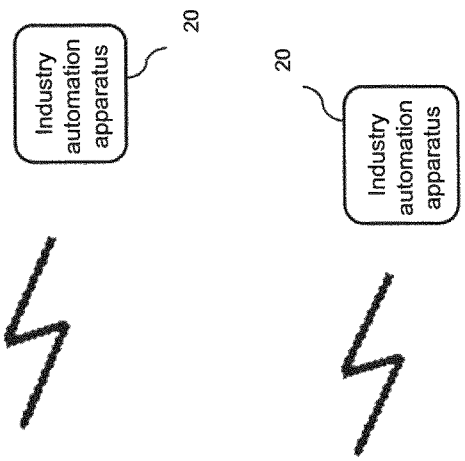
FIG. 3 is an embodiment of a communication system in accordance with the present disclosure.
Figure 3:
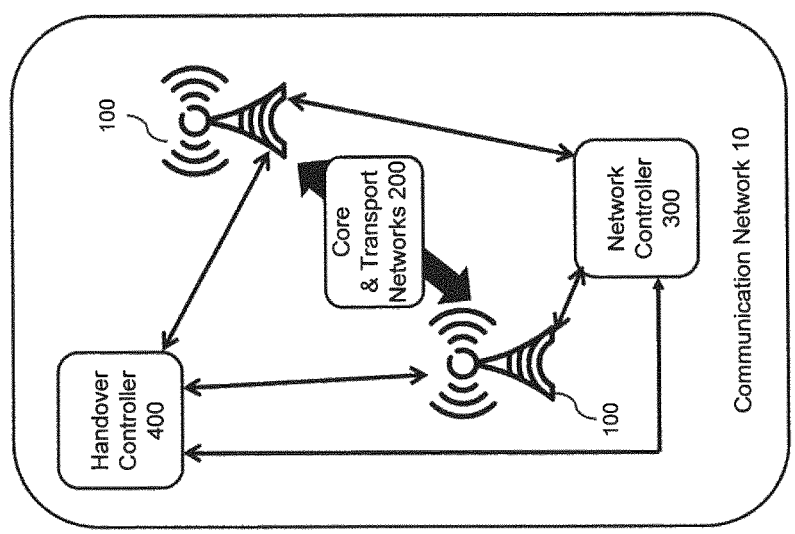

FIG. 3 illustrates an embodiment of a communication system comprising a communication network 10 and one or more industry automation apparatuses 20 configured to communicate with each other via the communication network 10. The communication network 10 is a cellular mobile communication network having a radio access network part conforming, for example, to at least one of the LTE and 5G specifications. Each industry automation apparatus 20 may take the form of an automated manufacturing device, such as a robot or any other manufacturing machine. Moreover, at least one of the industry automation apparatuses 20 may operate as a controller in a similar manner as, for example, a PROFINET PLC, and one or more of the industry automation apparatuses 20 may operate in a similar manner as a PROFINET I/O Device.

The communication network 10 comprises one or more BSs 100. Each BS 100 may take the form of an eNodeB. In the specific embodiment illustrated in FIG. 3, the communication system 10 comprises at least two BSs 100. The two BSs 100 are configured to communicate with each other via core and transport networks jointly denoted by reference numeral 200.

Still referring to FIG. 3, the communication network 10 further comprises a network controller 300 as well as a handover controller 400. One or both of the network controller 300 and the handover controller 400 may be located within the core and transport networks 200. Alternatively, one or both of the network controller 300 and the handover controller 400 may be co-located with or integrated in one of the BSs 100. In some variants, each BS 100 may have a network controller 300 and a handover controller 400 integrated therein or co-located therewith.

The communication network 10 comprises multiple functionally equivalent network entities such as the two BS 100. These network entities are grouped in a first network entity set and a second entity set disjoint to the first network entity set. As an example, a first one of the two BSs 100 illustrated in FIG. 3 may belong to the first network entity set, while a second one of the BSs 100 may belong to the second network entity set. It will be appreciated that the two network entity sets may comprise additional or alternative functionally equivalent network entities, such as functionally equivalent entities from the core and transport networks 200.

Figure 4:
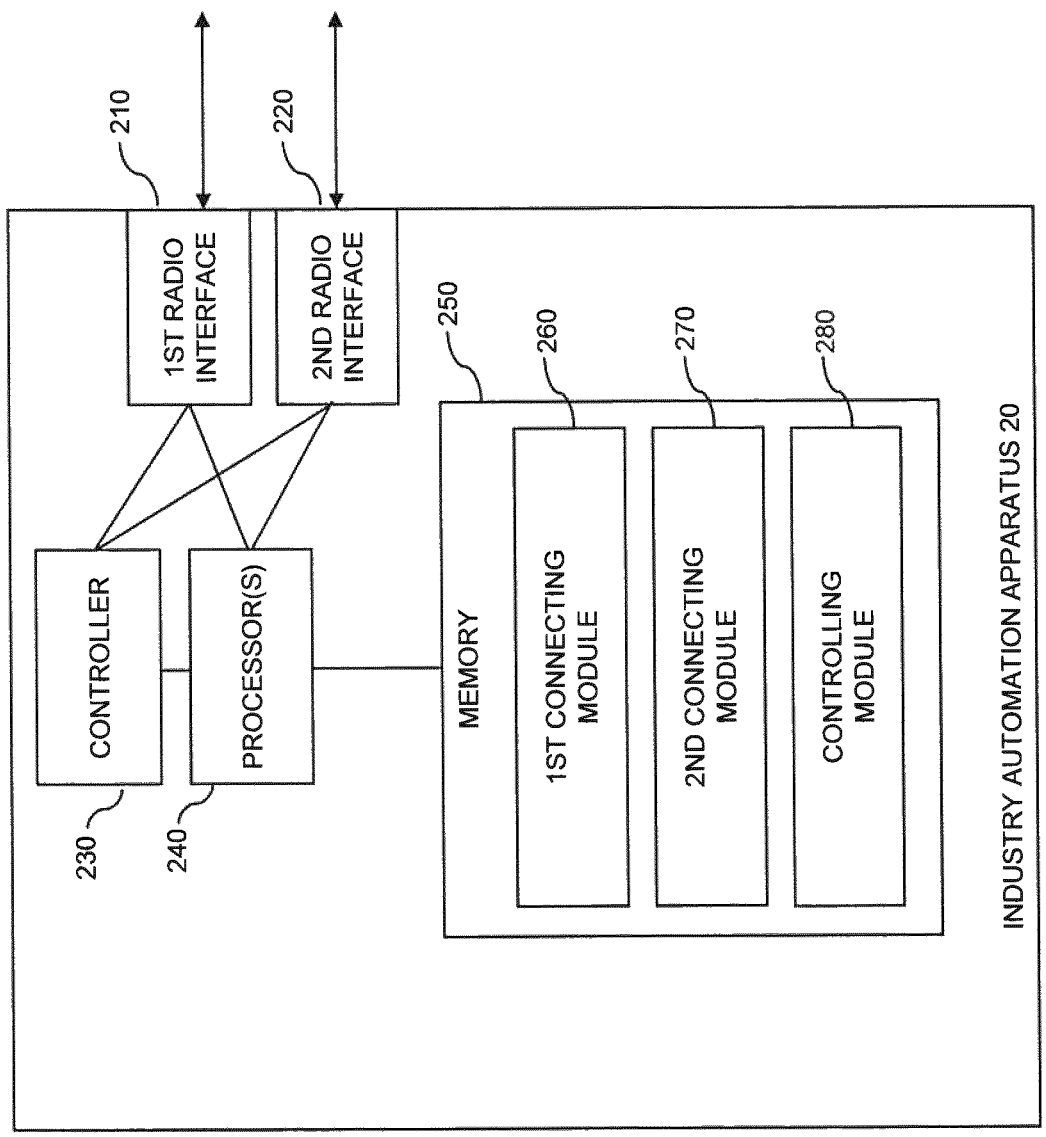
FIG. 4 is a schematic block diagram illustrating an industry automation apparatus embodiment according to the present disclosure.

FIG. 4 illustrates a schematic block diagram of one of the industry automation apparatuses 20 of FIG. 3. As shown in FIG. 4, the industry automation apparatus 20 comprises a first radio interface 210 as well as a second radio interface 220. The first radio interface 210 and the first network entity set that was discussed above with reference to FIG. 3 are associated with a first redundancy group. Similarly, the second radio interface 220 and the second network entity set are associated with a second redundancy group.

The first radio interface 210 and the second radio interface 220 are each configured to connect to the communication network 10 illustrated in FIG. 3. In the exemplary communication system scenario illustrated in FIG. 3, the first radio interface 210 and the second radio interface 220 may conform to the LTE or 5G standard.

The industry automation apparatus 20 further comprises a controller 230 coupled to both the first radio interface 210 and the second radio interface 220 as well as to one or more processors 240 of the industry automation apparatus 20. The one or more processors 240 are coupled to a memory 250 of the industry automation apparatus 20. As shown in FIG. 4, the memory 250 is configured to store program code in accordance with a first connecting module 260, a second connecting module 270 as well as controlling module 280 for execution by the one or more processors 240. It should be noted that the functions of the first connecting module 260, the second connecting module 270 and the controlling module 280 could also be implemented (at least partially) in hardware, for example within the first radio interface 210, the second radio interface 220 and the controller 230.

Figure 1:
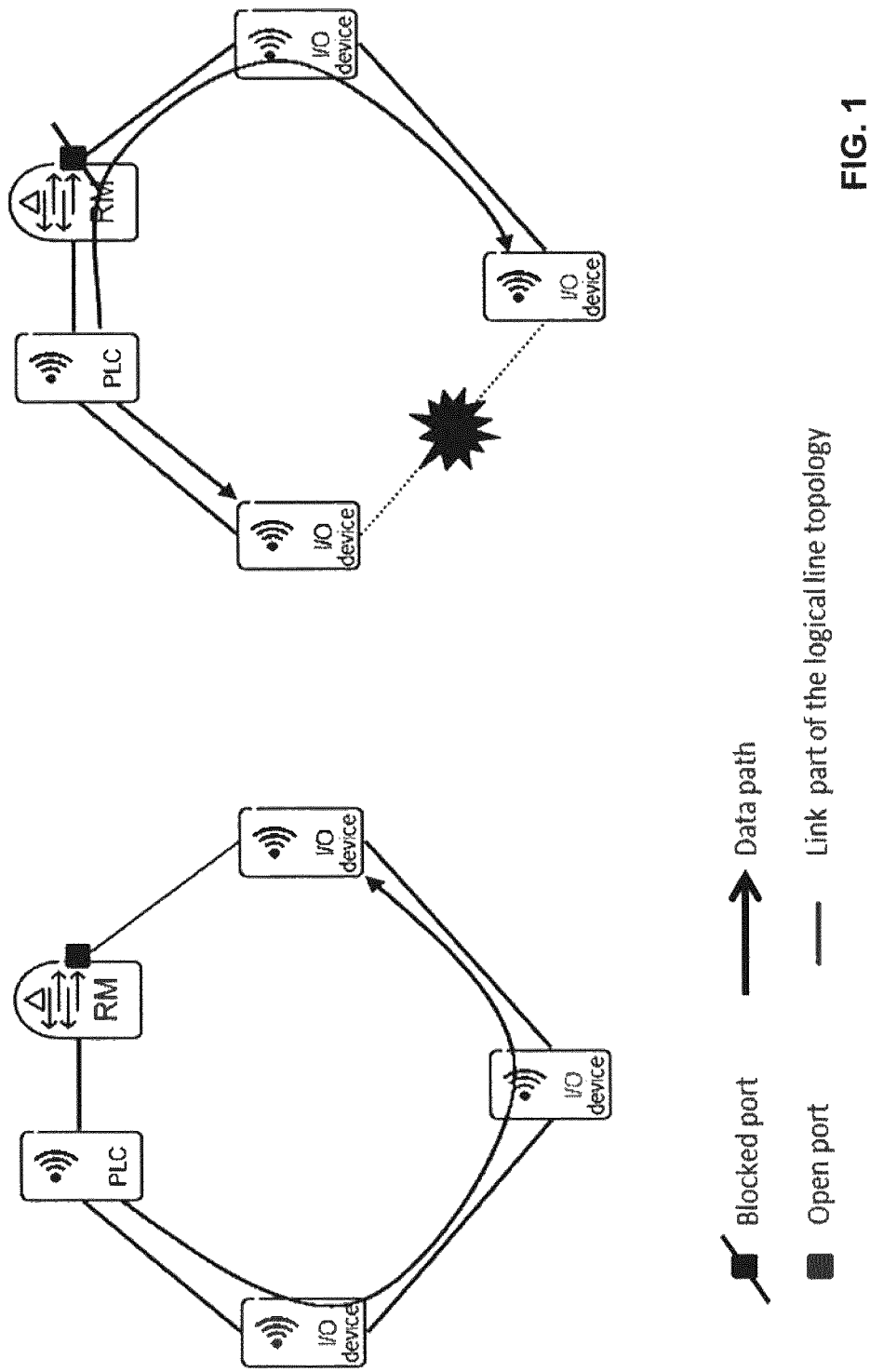
FIG. 1 is a schematic diagram illustrating a first failure handling scenario in a network with a ring topology.
Figure 2:
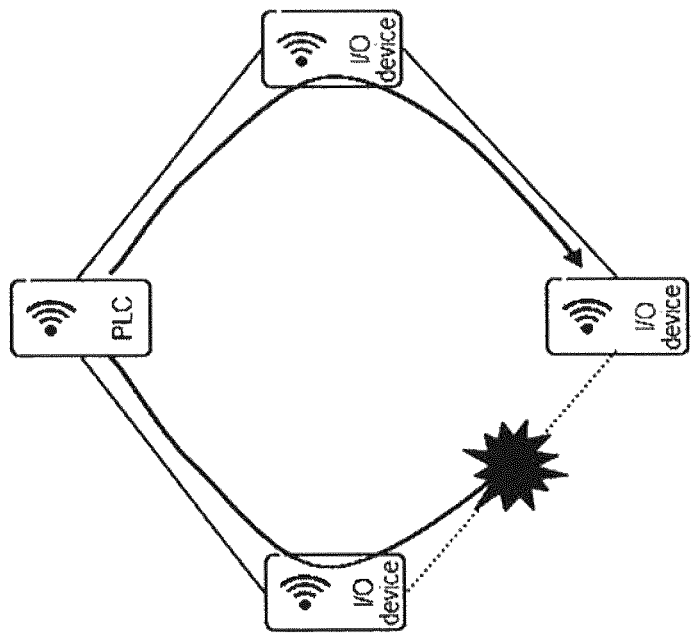
FIG. 2 is a schematic diagram illustrating a second failure handling scenario in a network with a ring topology.
Figure 2:
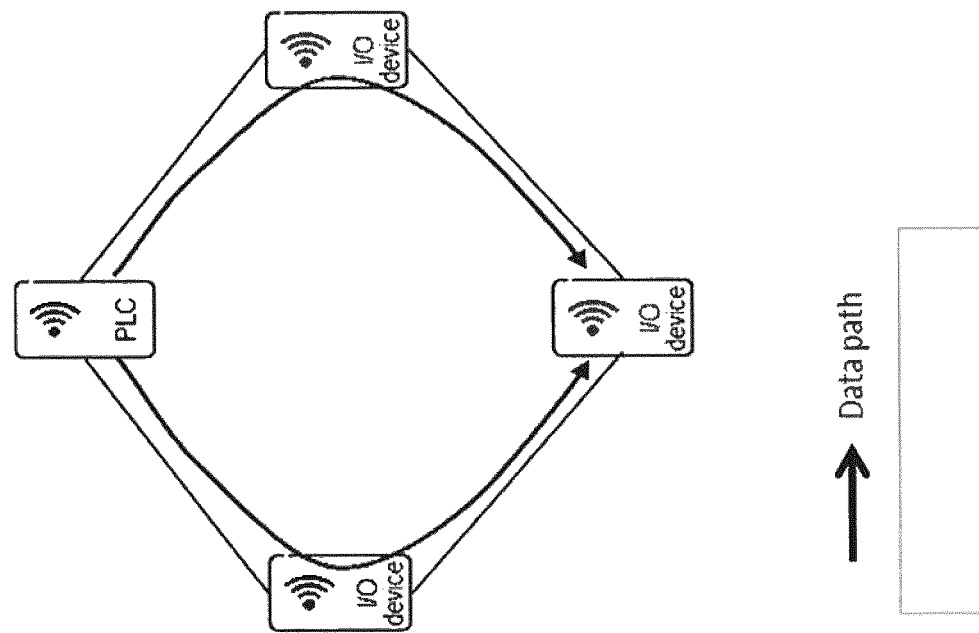

The connections between the radio interfaces 210, 220 and the communication network 10 are established and controlled using the first connecting module 260, the second connecting module 270 and at least one of the controlling module 280 and the controller 230. Specifically, at least one of the controlling module 280 and the controller 230 is configured to control the first radio interface 210 to be connected via the first network entity set to another apparatus (e.g., the second industry automation apparatus 20 illustrated in FIG. 2) and to control the second radio interface 220 to be connected in parallel via the second network entity set to this other apparatus.

In more detail, at least one of the controlling module 280 and the controller 230 may control the first radio interface 210 to signal to the communication network 10 a first grouping parameter associated with the first redundancy group and to control the second radio interface 220 to signal to the communication network 10 a second grouping parameter associated with the second redundancy group. Various exemplary grouping parameters will be discussed in more detail below. The different grouping parameters may then be exploited by the network controller 300 for assigning an individual radio interface 210, 220 to an individual redundancy group.

Figure 5:
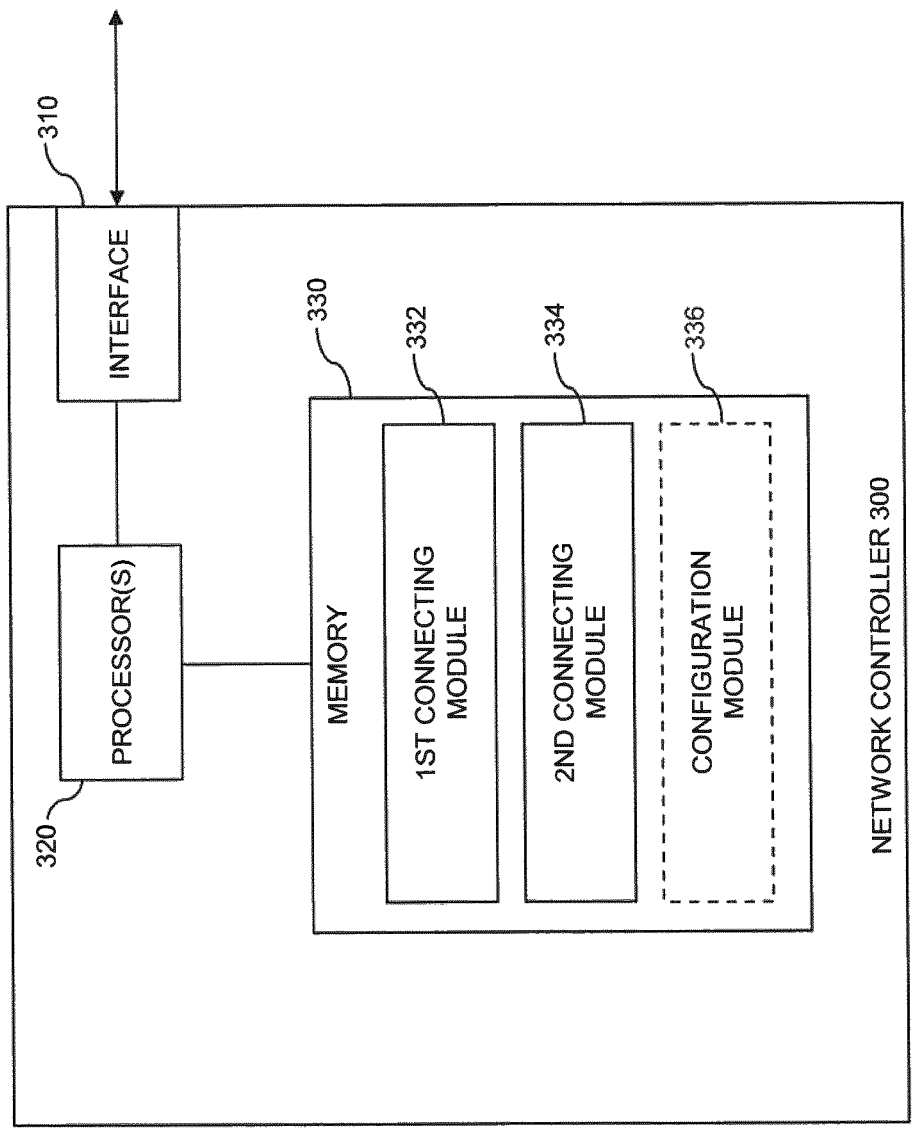
FIG. 5 is a schematic block diagram illustrating a network controller embodiment according to the present disclosure.

FIG. 5 illustrates a schematic block diagram of the network controller 300 of FIG. 3. As shown in FIG. 5, the network controller 300 comprises an interface 310, one or more processors 320 coupled to the interface 310 as well as a memory 330 coupled to the one or more processors 320. The interface 310 may be configured to be coupled to any one of the BSs 100 or any entity within the core and transport networks 200 illustrated in FIG. 3. As an example, the interface 310 may be configured to receive the grouping parameters discussed above. Additionally, or in the alternative, the interface 310 may be configured to transmit or trigger transmission of these grouping parameters to the industry automation apparatus 20 for assignment by the controller 230 or the controlling module 280 to the respective radio interface 210, 220.

As shown in FIG. 5, the memory 330 is configured to store program code in accordance with a first connecting module 332, a second connecting module 334 and an optional configuration module 336 for execution by the at least one processor 320. It should be noted that the functions of these modules 332, 334 and 336 could also be implemented (at least partially) in hardware.

The first connecting module 332 is configured to connect the first radio interface 310 of the industry automation apparatus 20 via the first network entity set to another apparatus, such as the second industry automation apparatus 20 shown in FIG. 3. The connecting operation of the first connecting module 332 is performed in response to determining that the first radio interface 210 belongs to the first redundancy group. Such determination may be performed by the network controller 300, for example on the basis of information received via the interface 310, such as the grouping parameters. Similarly, the second connecting module 334 is configured to connect the second radio interface 220 of the industry automation device 20 via the second network entity set, and in parallel to the first radio interface 210, to the other apparatus 20. The operation of the second connecting module 334 is performed in response to determining that the second radio interface 220 belongs to the second redundancy group (e.g., similarly based on information received by the network controller 300 via the interface 310).

The configuration module 336 is configured to dynamically configure the first network entity set and the second network entity set. As an example, the configuration module 336 may dynamically reduce the redundancy by connecting the first radio interface 210 and the second radio interface 220 via the same entity from either the first network entity set or the second network entity set to the other apparatus 20.

It should be noted that the first network entity set and the second network entity set may still each include one or more further entities not shared between the first radio interface 210 and the second radio interface 220. In this manner at least a certain degree of redundancy can be maintained.

Figure 6:
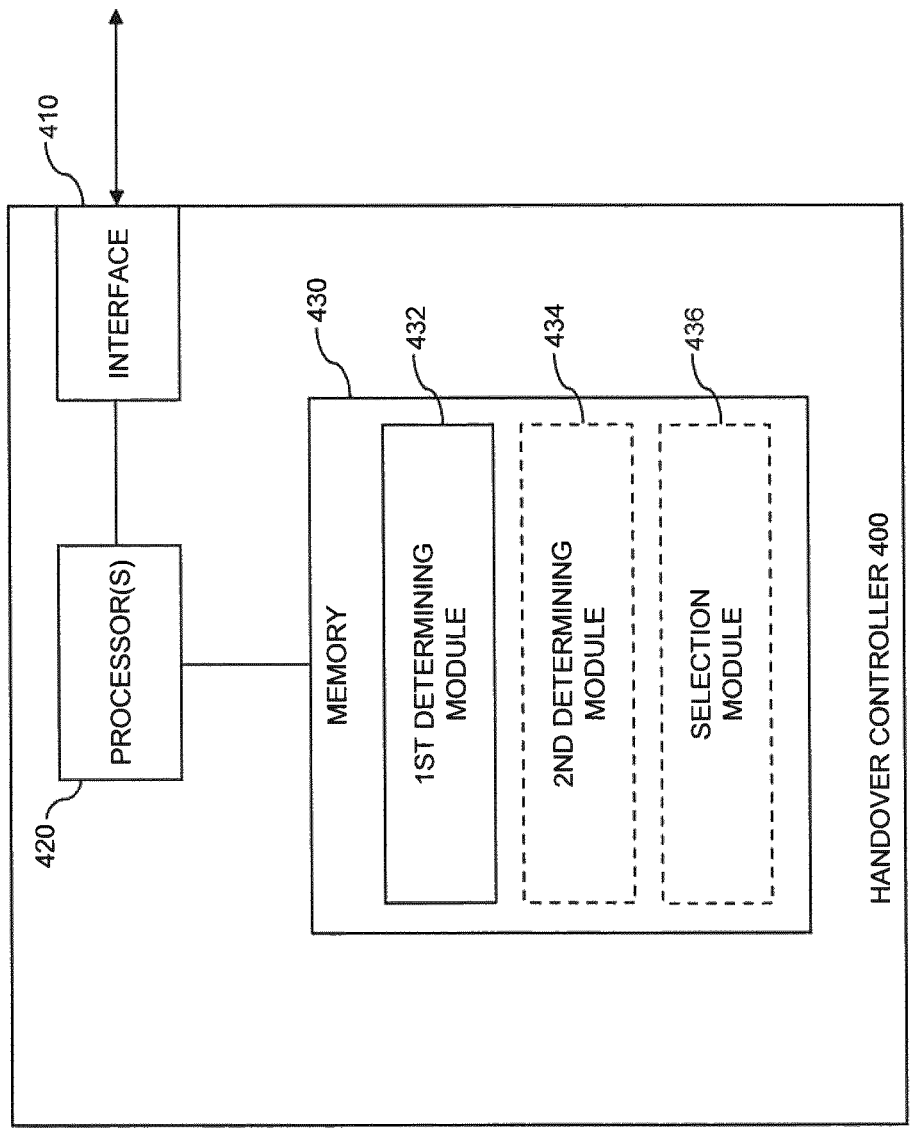
FIG. 6 is a schematic block diagram illustrating a handover controller embodiment of the present disclosure.

FIG. 6 illustrates a schematic block diagram of the handover controller 400 of FIG. 3. As shown in FIG. 6, the handover controller 400 comprises an interface 410, one or more processors 420 coupled to the interface 410, as well as a memory 430 coupled to the one or more processors 410.

The memory 430 is configured to store a program code in accordance with a first determining module 432, an optional second determining module 434 and an optional selection module 436 for execution by the one or more processors 420. It should be noted that the functions of the modules 432, 434 and 436 could also be implemented (at least partially) in hardware.

The first determining module 432 is configured to determine, for a handover of the first radio interface 210 from a current first network entity, a potential new first network entity from the first network entity set. As an example, the communication network 10 illustrated in FIG. 3 could also comprise three BSs 100, wherein two of the BSs 100 belong to the first network entity set and a second BSs 100 belongs to the second network entity set. In such a case the first determining module 432 may determine one of the two BSs 100 within the first network entity set as a potential candidate for handover from the other BS 100 in the first network entity set.

The optional second determining module 434 may be configured to determine that no potential new first network entity from the first network entity set can be found.

The selection module 436 could be configured to select a network entity not included in the first network entity set (but, e.g., included in the second network entity set) for the handover in response to the determination performed in the second determining module 434.

Figure 7:
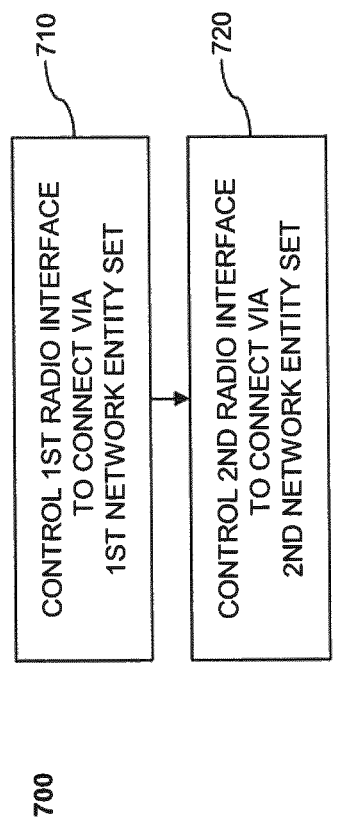
FIG. 7 is a flow diagram illustrating a first method embodiment according to the present disclosure.

FIG. 7 illustrates in a flow diagram 700 a method embodiment performed by the industry automation device 20 of FIGS. 3 and 4. In a first step 710, the controlling module 280 or the controller 230 controls the first radio interface 210 to connect via the first network entity set to the other apparatus. Simultaneously, or at a different point in time, the controlling module 280 or the controller 230 controls the second radio interface 220 to connect via the second network entity set to the other apparatus 20 (see step 720).

Figure 8:
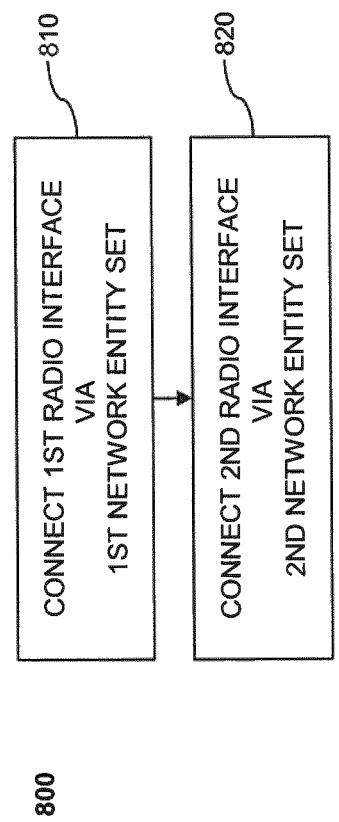
FIG. 8 is a flow diagram illustrating a second method embodiment according to the present disclosure.

FIG. 8 illustrates a flow diagram 800 of a method embodiment performed by the network controller 300 of FIGS. 3 and 5. In a first step 810 the first connecting module 332 connects the first radio interface 210 of the industry automation apparatus 20 via the first network entity set to the other apparatus 20. Simultaneously, or at a different point in time, the second connecting module 334 connects the second radio interface 220 of the industry automation device 20 via the second network entity set to the other apparatus 20.

Figure 9:
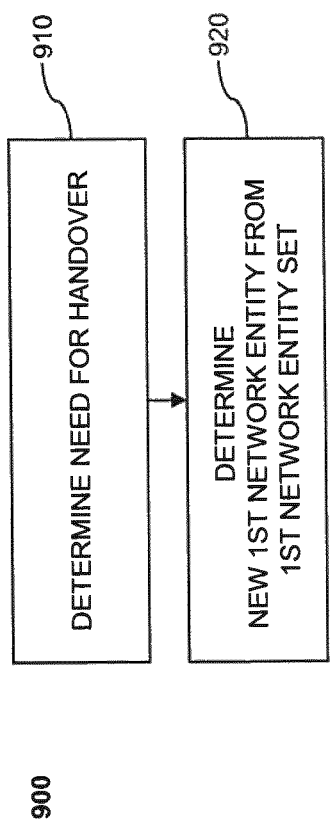
FIG. 9 is a flow diagram illustrating a third method embodiment according to the present disclosure.

FIG. 9 illustrates a flow diagram 900 of a method embodiment performed by the handover controller 400 of FIGS. 3 and 6. In an optional first step 910, the handover controller 400 determines a need for a handover of the first radio interface 210 of the industry automation apparatus 20 (e.g., based on link quality measurements). In a further step 920, the first determining module 432 determines a new first network entity from the first network entity set for the handover. As has been explained above, the handover controller 400 may determine that no potential new first network entity from the first network entity set can be found. In such a case a network entity not included in the first network entity set may be selected for the handover of the first radio interface 210.

The following embodiments described with reference to FIGS. 10 to 16 may be implemented using the communication network 10 (with the BSs 100, the core and transport networks 200, the network controller 300 and the handover controller 400) as well as the industry automation apparatuses 20 of FIGS. 3 to 6 and in accordance with the method embodiments illustrated in FIGS. 7 to 9. The same reference numerals as in FIGS. 3 to 6 will be used to denote the same or similar components.

As explained above, each industry automation apparatus 20 includes two or more radio interfaces 210, 220 which belong to different redundancy groups (denoted as A, B, etc. in the following embodiments). In one exemplary implementation, the Radio Access Network (RAN) part of the communication network 10 offers redundant coverage, such that an industry automation area is typically covered by two or more BS 100, belonging to different redundancy groups (e.g., A, B, etc). Core Network (CN) and Transport Network (TN) entities can also be provided in a redundant manner (and respectively belong to one of redundancy groups A, B, etc.).

In the embodiments depicted in FIGS. 10 to 12 and 16, the radio interfaces 210, 220 are also exemplarily denoted as User Equipments (UEs) in accordance with the notation of certain 3G, 4G and 5G communication standards. When such a notation is used, each individual user interface 210, 220 may be regarded as constituting a "full" UE in accordance with these standards. However, in each case the respective radio interface 210, 220 could also comprise less functionalities than a respective "full" UE.

Figure 10:
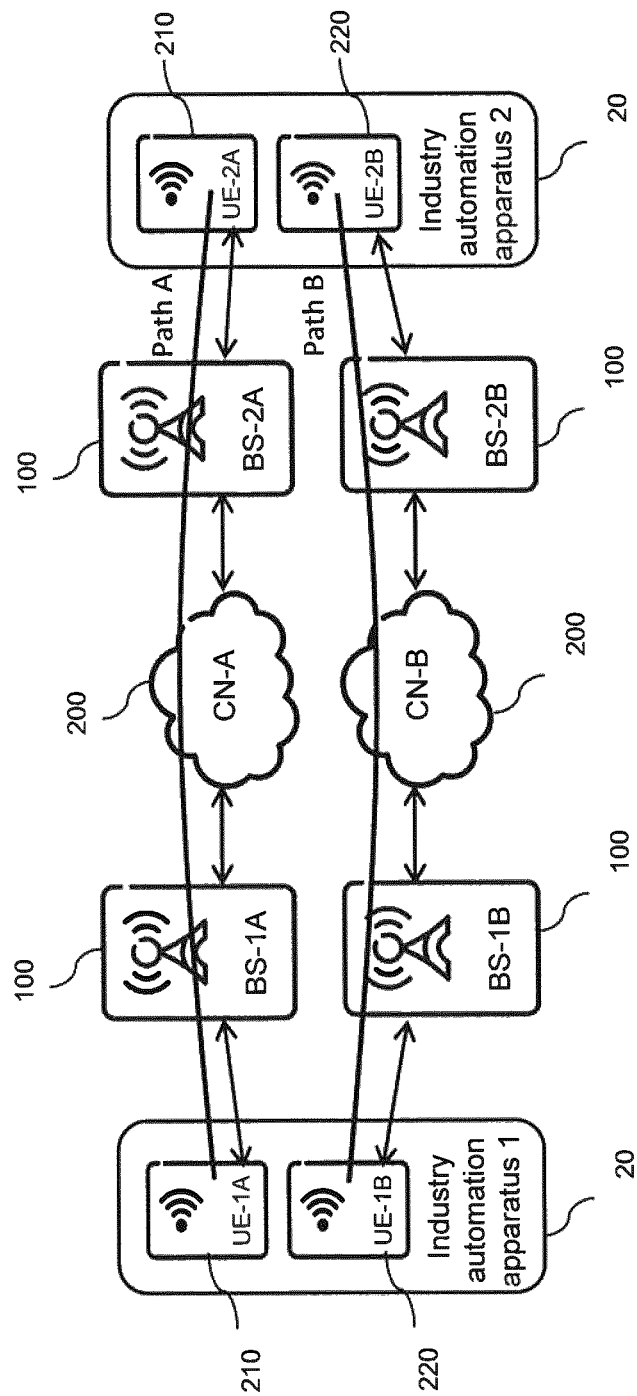
FIG. 10 is a schematic diagram illustrating a first connection embodiment according to the present disclosure.

As shown in FIG. 10, normally a radio interface 210 (e.g., a UE such as UE-1A) belonging to redundancy group A of a industry automation apparatus 1 connects to a base station BS-1A also in redundancy group A, and may further use network entities (e.g., of the CN 200) also in redundancy group A, i.e., CN-A, to reach an associated radio interface 210 (e.g., another UE such as UE-2A) also in group A of industry automation apparatus 2 via base station BS-2B. Similarly, a radio interface 220 (UE-1B) belonging to redundancy group B of industry automation apparatus 2 connects to a BS (BS-1B) in group B, and may further use network entities CN-B and BS-2B also in group B to reach an associated radio interface 220 (UE-2B) in group B in apparatus 2.

In this way, the two industry automation apparatuses 1, 2 are redundantly and in parallel connected by two communication paths that are independent. The redundant connection approach presented herein makes it possible to instantly switch from one established communication path (the working path A) to the other established communication path (the redundancy path B) in case of any failure. Failures may, for example, occur in the radio interfaces 210, 220, in the BSs 100, in CN control plane or user plane nodes, or in the TN.

As said, the radio interfaces 210, 220 illustrated in FIG. 10 may conform to upcoming RATs such as 5G, or to existing RATs such as 4G. In the case of 4G, the RAT can be LTE, and a BS 100 corresponds to an eNB. The CN entities may include a Mobility Management Entity (MME) on a control plane, and one or more Service Gateways (SGWs) and Packet Gateways (PGWs) on a user plane. As said, the functionally equivalent CN entities may likewise be grouped into different redundancy groups (e.g., a first PGW may belong to redundancy group A, and a second PGW may belong to redundancy group B).

The following embodiments focus on redundancy for the BSs 100 in the RAN. However, as explained above, they may also be extended to CN entities. For example, it is possible in an industry automation network that the CN entities are contained in the same node as the BS 100, and selecting separate BS entities would then also correspond to selecting separate CN entities. Alternatively, it is possible that the CN entities are directly connected to the BS 100. As yet another alternative, redundancy for the CN entities may be provided by their underlying platforms. Terminal-based and network-based solutions, respectively, for setting up redundant CN entities for the two duplicate paths may be used.

Even though some embodiments consider two or more UEs to provide the two or more radio interfaces 210, 220 per industry automation apparatus 20, it is possible to have certain parts of the two UEs (and thus of the two radio interfaces 210, 220) combined. For example, the two UEs could have a common SIM (including USIM) for identification and/or authentication. In that case, the two UEs can use the same credentials to authenticate themselves. In this case, however, the different UEs still need to differentiate themselves via different grouping parameters to the network 10 (i.e., to the network controller 300 and/or the handover controller 400 included therein). This can be done by adding an additional identifier (such a sequence number) in the access or other signalling, which tells the two UEs apart for the network 10.

The following embodiments differentiate between two main options how a radio interface 210, 220 is connected to a BS 100 in one of the redundancy groups A, B. The corresponding operations, in particular the grouping operations, can be formed by the network controller 300 as discussed above in connection with FIGS. 3, 5 and 8.

In case of static redundancy grouping, a radio interface 210, 220 in a given group A, B is always connected to a BS 100 in the same group, and does not connect to a BS 100 in another group even if it is out of coverage of all the BSs 100 in its own group.

In case of dynamic redundancy grouping, a radio interface 210, 220 in a given group A, B preferably connects to a BS 100 in the same group. However, if the radio interface 210, 220 is out of coverage (i.e., the link quality as exemplary metric goes below a certain threshold) for all the BSs 100 in its own group, the radio interface 210, 220 may connect to a BS 100 in another group as well.

In the normal case when the RAN coverage of the different redundancy groups A, B overlap, there is no difference between static and dynamic redundancy groupings: in both cases the radio interfaces 210, 220 connect to a BS 100 in their own group, and in this way two industry automation apparatuses 20 can set up independent network paths A, B, using radio interfaces 210, 220, BSs 100 and other network entities in different redundancy groups as shown in FIG. 10. The difference between static and dynamic redundancy groupings occurs in the case when the RAN coverage of the different redundancy groups is not identical. Such coverage differences can be quite common, since different BS placements and different positions of the corresponding antennas naturally lead to some coverage differences as well.

Figure 11:
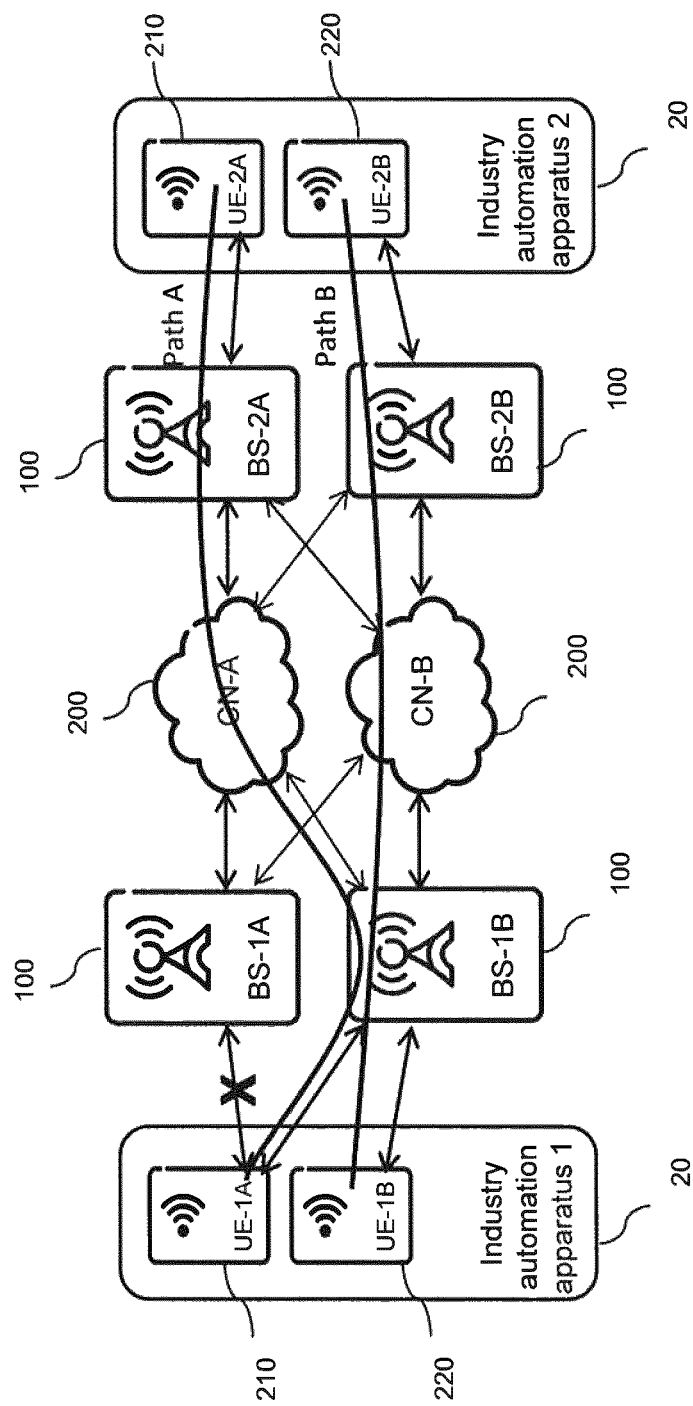
FIG. 11 is a schematic diagram illustrating a second connection embodiment according to the present disclosure

FIG. 11 can be used to explain case of static redundancy grouping. If radio interface UE-1A is out of coverage of BS-1A, and there is no other BS 100 in group A that radio interface UE-1A can connect to, only one of the network paths (path B) to the BSs 100 is kept, and the path via BS-1A cannot be used. The communication network 10 can continue to support communication between industry automation apparatuses 1 and 2—however, there is no more resilience against failures on the communication path B.

For dynamic redundancy grouping, it may then happen that the radio interfaces UE-1A and UE-1B in the same apparatus 20 both connect to BS BS-1B, since, for example, radio interface UE-1A is out of coverage of all the BSs 100 in group A, as illustrated in FIG. 11. In this case, BS-1B becomes a single point of failure, since the failure of BS-1B impacts both network connections A and B. Naturally, the level of reliability will be lower in case BS-1A is not reachable by UE-1A. However, it remains possible to keep both communication paths, or connections, A and B, which are independent with the exception of BS-1A. Therefore, the two connections still provide protection against the failure of any CN entity on the corresponding network paths, or against the failure of UA-1A or UE-1B, or against a failure at the communication peer (failure of the other radio interfaces 210, 220 or associated BSs 100). In this way, dynamic grouping can provide a higher level of reliability.

For dynamic redundancy grouping, UE-1A should in one variant continue to use the CN entities in CN-A; this can be achieved by continued use of the identifiers of CN-A's control plane entities as grouping parameters associated with group A, and the control plane entities can keep user plane entities unchanged in CN-A. Transport level connectivity should in one variant be present also between a CN 200 in one redundancy group and a BS 100 in another redundancy group (which is typically not necessary for static redundancy grouping). The transport network may be configured in such a way for dynamic redundancy grouping that the transport connectivity uses entities in the original redundancy group as much as possible even if a BS 100 from a different redundancy group is used.

1. Static Redundancy Grouping Re-Using Existing System Features

For static redundancy grouping, it is possible to re-use existing system features, even though these system features were originally intended for other purposes. In the following, an example based on Tracking Areas (TAs) and another example based on subscriber groups will be presented. Of course, static redundancy grouping could also be realized using different or new system features.

The feature of Forbidden Tracking Areas (FTAs) was originally intended to allow an operator to restrict network access in certain areas for certain UEs, e.g., in areas that require a higher level of security or that should not be accessible by the general public, or in areas which are used for test purposes. To realize redundancy groupings with this feature, the BSs 100 in different redundancy groups A, B would be placed in different TAs (e.g., by the network controller 300). A radio interface 210, 220 (in the following again denoted UE in accordance with the TA denomination) belonging to a given redundancy group A, B is configured to be forbidden to access the Tracking Areas of all other redundancy groups A, B. In this way, it can be ensured that a UE only connects to the BSs 100 in its own redundancy group (an exception is that the present specifications allow emergency calls also in FTAs). It should be noted that this approach is a static solution, i.e., in case of a failure on one of the redundancy groups A, B, the UE may not switch over to, for example, a BS 100 in another redundancy group, as that is forbidden for the UE in this embodiment.

FTAs can be realized by downloading a list of forbidden areas from the MME to the eNB (i.e., BS 100) during the establishment of a RAN context, so that the eNB excludes forbidden cells from being handover candidates. In idle mode, the list of FTAs is downloaded to the UE, and the UE considers the respective cells as unsuitable during cell selection and re-selection.

For devices that have a single UE only and may use BSs 100 in any redundancy group A, B, there could be frequent TA changes. To avoid too frequent Tracking Area Update signalling, it is possible for the network 10 to implement the Tracking Area List feature, such that these UEs can belong to multiple Tracking Areas.

The Closed Subscriber Groups (CSG) feature was intended to limit the access of certain cells for certain UEs. BSs 100 in a given CSG can only be accessed by UEs that are members of the given CSG. This feature was meant especially (but not exclusively) for femto cells or other small cells so that only the owner or the ones with the necessary access rights can access these cells.

To use CSGs for redundancy groupings, it is possible define (e.g., by the network controller 300) one CSG for each redundancy group A, B, and make the corresponding radio interfaces 210, 220 (in the following denoted UEs in accordance with the CSG denomination) part of the respective CSG. In this way it can be ensured that a UE in a given redundancy group A, B can only connect to a BS 100 in the same redundancy group. In such an implementation, "normal" UEs (not part of industry automation devices with duplicate radio interfaces) would need to be part of all CSGs corresponding to the redundancy groups since otherwise they would not be able to access these cells (unless the cells are deployed selectively for a particular industry automation area, which is also foreseen for certain embodiments).

In case an operator wishes to use CSGs in the network 10 for other purposes, and also introduce CSGs to manage redundancy groupings, each CSG may be split up into several CSGs corresponding to each redundancy group A, B. In addition, the operator may define CSGs for the cells that would otherwise not be part of a CSG. UEs need to be members of the CSG corresponding to their redundancy grouping, and additionally part of the CSG corresponding to the other CSG memberships, with the appropriate redundancy grouping. Such CSG management could be done centrally by the operator (e.g., via the network controller 300).

2. Explicit System Support for Dynamic Redundancy Groupings

In all embodiments presented herein, each cell and each radio interface 210, 220 may uniquely be assigned to a redundancy group A, B. In a typical realization, all the cells supported by a BS 100 would belong to the same redundancy group A, B.

In an embodiment with dynamic redundancy groupings, a radio interface 210, 220 preferentially connects to a cell in the same redundancy group A, B. A radio interface 210, 220 connects to a cell in a different redundancy group only if, for example, the link quality to the cells in the same redundancy group is too bad, governed by a configurable metric. If a metric threshold parameter is set to an extremal value, the radio interface 210, 220 would never connect to a cell in a different redundancy group and in this way the solution can be configured to work as static redundancy grouping. Otherwise, in the general case, the solution realizes a dynamic redundancy grouping.

2.1 Definition of Redundancy Groups

The cells and/or other network entities can be assigned to redundancy groups by configuration, e.g., using the Operating & Maintenance (O&M) function of a BS 100 or the network controller 300. As explained above, the network controller 300 could also be integrated into a BS 100. The radio interfaces 210, 220 can be assigned to redundancy groups A, B in several ways:

- A radio interface 210, 220 may indicate its redundancy grouping when it attaches to the network by signalling a new system parameter (i.e., a grouping parameter). Such a grouping parameter can be signalled e.g., in the Attach Request message, and optionally also or alternatively in one or both of the Tracking Area Update Request or Service Request messages.
- A subscription underlying each radio interface 210, 220 may contain information (i.e., a grouping parameter) about the redundancy grouping (e.g., in the HSS subscription records).
- The redundancy grouping may be given by explicit configuration (e.g., corresponding to the respective IMSI or IMEI number used by the radio interfaces 210, 220). As an option, it is possible to use some bits of the IMSI or IMEI to identify the redundancy groupings. When, for example, an industry automation apparatus 20 is manufactured including two radio interfaces 210, 220, the radio interfaces 210, 220 may have one bit difference in their IMSI or IMEI numbers, which indicates the respective redundancy grouping. Other bits may indicate that the radio interface 210, 220 is part of a device with multiple radio interfaces 210, 220, i.e., an industry automation apparatus 20 as described herein. Using specific bits of the IMSI is especially relevant in case the radio interfaces 210, 220 do not have a detachable (U)SIM card, but rather have an embedded SIM or soft SIM, in which case these bits can be better kept under control.
- The redundancy grouping may also be determined based on the way the radio interfaces 210, 220 connect to the communication network 10. In case of industry automation apparatuses 20 with two radio interfaces 210, 220, it is possible to assign the radio interface 210 first attaching to the network 10 into a first redundancy group A, and the radio interface 220 which is second to attach to the network 10 gets assigned to a second redundancy group B. Alternatively, the radio interface 210 that attaches first can be assigned to a random redundancy group A, and the radio interface 220 that attaches second can be assigned to another redundancy group B. In this sub-option, the radio interfaces 210, 220 may each signal an identifier (i.e., a grouping parameter) which indicates which industry automation apparatus 20 they belong to so that the network 10 can match multiple radio interfaces 210, 220 to the same apparatus 20.

2.2 Connected Mode Mobility

System procedures, especially in the handover controller 400, may take the redundancy grouping into account. For connected mode mobility, the BSs 100 (and the handover controllers 400 integrated therein) have knowledge about the redundancy group A, B of their own cells, and the redundancy group of the neighbour cells. The neighbour cell information becomes known when the X2 connectivity is set up, together with other information (such as the E-UTRAN Cell Global Identifier, ECGI, and TA identifier) of the neighbouring cells. Each BS 100 (and handover controller 400 integrated therein) also has knowledge about the redundancy group A, B of the respective radio interface 210, 220. That information is known in the CN network 200, and it is sent to the BS 100 when the RAN context is established; the information becomes part of the radio interface 210, 220 (i.e., UE) context in RAN and maintained at the current serving BS 100 (i.e., grouping parameter) as the radio interface 210, 220 performs handovers.

Figure 12:
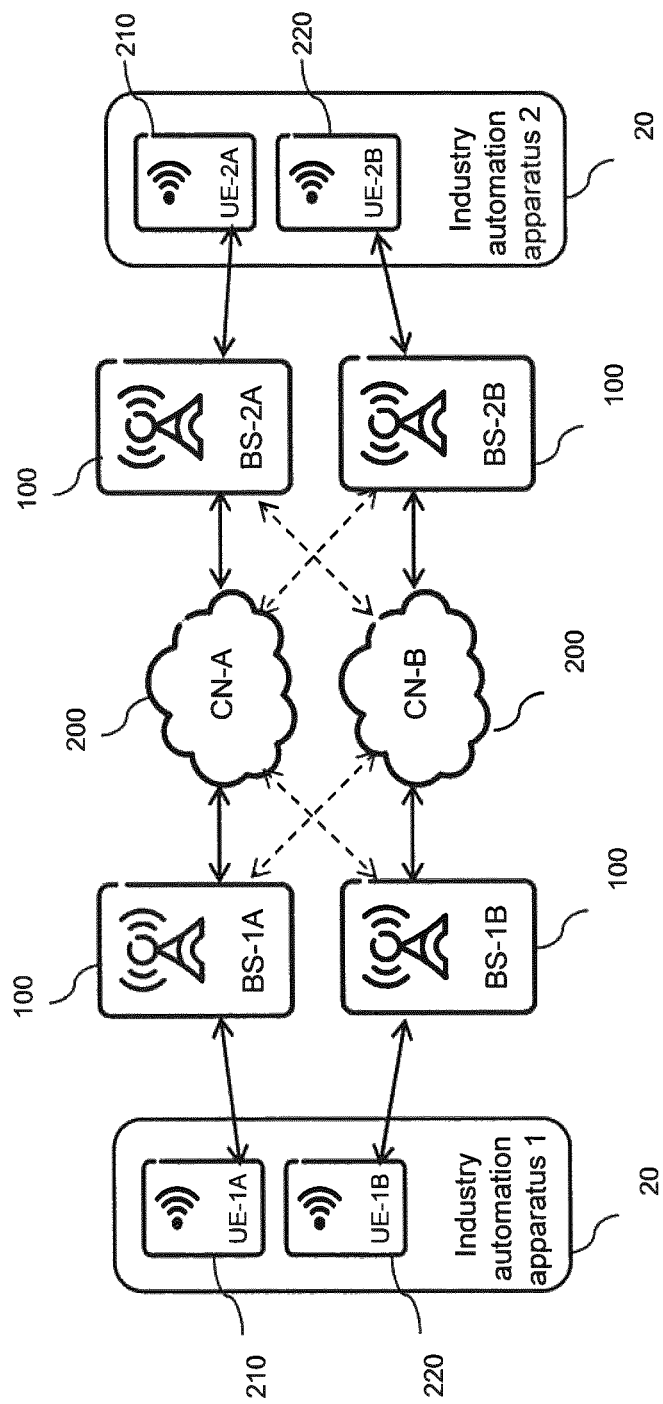
FIG. 12 is a schematic diagram illustrating a third connection embodiment according to the present disclosure

The redundancy group of a radio interface 210, 220 can be sent as a new information element (i.e., a grouping parameter) from the CN network 200 (e.g., the MME) to the RAN (e.g., the eNB) as illustrated by dashed arrows in FIG. 12; alternatively this information can also be expressed as special values of other parameters. One possible parameter is the RFSP (RAT/Frequency Selection Priority, also known as Subscriber Profile ID for RAT/Frequency Priority). This is an already existing parameter that is used for UE specific radio resource management setting. Separate values can be defined for each redundancy group A, B. If the RFSP is used for other purposes as well in RAN, then each existing RFSP value can be split up for different values for each redundancy group A, B. Hence, a new information element may be preferred from the CN network 200 to the RAN (see FIG. 12) to convey the redundancy group information for a radio interface 210, 220. Another existing parameter that can be used is the Handover Restriction List (i.e., that handover targets in other redundancy groups are restricted).

For handover decisions, the handover controller 400 in a BS 100 may down-prioritize cells which are in a different redundancy group A, B than the radio interface 210, 220 (e.g., using a configurable threshold). Normally, a radio interface 210, 220 is handed over only to cells in the same redundancy group A, B; only when the cells in the same redundancy group A, B have a link quality (or other parameter) below a given threshold, the radio interface 210, 220 would be handed over by the respective handover controller 400 to a cell in another redundancy group (e.g., when the radio interface 210, 220 is out of coverage of its own redundancy group, as described above for dynamic redundancy grouping). The threshold may configurable, and it is possible to completely forbid cells in different redundancy groups as mentioned earlier (i.e., use static redundancy grouping).

Thus, the set of candidate handover targets can modified by the handover controller 400 depending on the measured link quality of the cells in the same redundancy group A, B.

- If the link quality Q in the best cell in the redundancy group A, B of the radio interface 210, 220, measured by the radio interface 210, 220, is above a configurable threshold T (i.e., Q T), the handover controller 400 (which may be integrated into the BS 100) only allows cells in the same redundancy group as handover targets.
- If the link quality in the best cell in the redundancy group A, B is below the threshold (i.e., Q<T), the handover controller 400 allows all cells as handover targets, including those in other redundancy groups.

Figure 13:
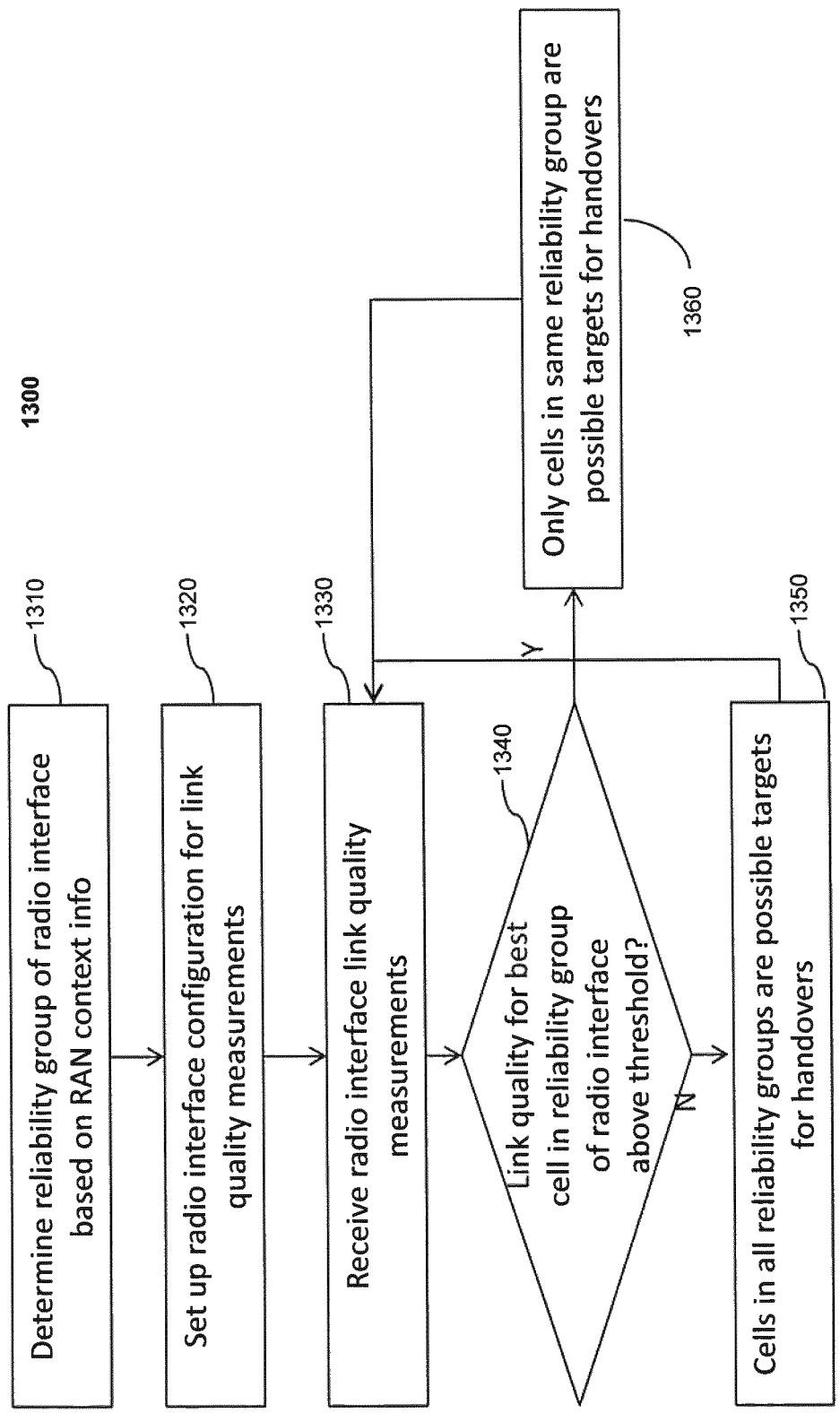
FIG. 13 is a flow diagram illustrating a further method embodiment of the present disclosure.

A schematic flow diagram 1300 illustrating this process is shown in FIG. 13. The flow diagram of FIG. 13 shows a method embodiment that could be performed by the handover controller 400 as illustrated in FIGS. 3 and 6 and as described above with reference to FIG. 9.

In an initial step 1310, the reliability group A, B of a radio interface 210, 220 is determined on the basis of RAN context information, as generally explained above. Then, in step 1320, a radio interface configuration is set up for link quality measurements. In step 1330 the radio interface link quality measurements are received from the corresponding industry automation apparatus 20. It is then determined in step 1340 if the link quality for the best cell in a given reliability group A, B of the radio interface 210, 220 is above a configurable threshold. If this is not the case, the method proceeds to step 1350, where cells in all reliability groups are indicated as possible targets for handovers. Otherwise, if it is found in step 1340 that the link quality is not above the threshold, the method proceeds to step 1360, where only cells in the same reliability group are defined as possible targets for handovers.

Of course, there can be other ways of down-prioritizing cells in other redundancy groups. Moreover, there can be many other criteria which govern handover decisions in the same manner as discussed above in regard of link quality, such as measured speed of the radio interface 210, 220, cell load measurements, timing limitations, ping-pong avoidance, QoS criteria, operator policies and so on. These criteria remain applicable within the context of this disclosure as well. The important aspect is that cells in other redundancy groups are down-prioritized by the handover controller 400 in a configurable way for handover decisions.

As an optimization, the handover controller 400 may take into account the cell redundancy groups A, B when configuring the radio interfaces 210, 220 for handover measurements. Several optimizations can be possible which can be configured in the network 10, for example:

- As long as the radio interface 210, 220 is at a cell in its own redundancy group A, B and the current cell's link quality is above a given threshold, exclude neighbour cells in other redundancy groups from measurements by black-listing those cells in the measurement configuration.
- In case some or all of the other redundancy groups A, B use a different frequency than the frequency used by the redundancy group A, B of a given radio interface 210, 220, the measurements on other frequencies used by the other redundancy groups A, B could be made less frequent. It is possible to avoid such measurements completely as long as the link quality of the given radio interface 210, 220 is above a certain threshold or meets any other constraint. Avoiding measurements in other frequencies is advantageous as such measurements require the setting of measurement gaps for the radio interfaces 210, 220 during which the radio interfaces 210, 220 cannot transmit or receive on the current cell.

2.3 Idle Mode Mobility

In the case of idle mode mobility, two options are possible.

a) BSs 10 broadcast the cell's redundancy group information (i.e., the corresponding grouping parameters), and that information is read by the radio interfaces 210, 220 in idle mode.

In this case, radio interfaces 210, 220 in idle mode take into account the cell's redundancy group A, B for cell selection. Cells in the same redundancy group A, B take precedence over cells in other redundancy groups A, B. A configurable threshold or other constraint can be used such that a cell in another redundancy group A, B is selected only if all cells in the same redundancy group A, B have a link quality or other parameter that is worse than the threshold (i.e., does not meet the constraint). It could be possible to set the threshold to an extreme low value, in which case no cells will be selected in other redundancy groups A, B. Other ways to down-prioritize cells in different redundancy groups A, B can also be used.

In this case, each radio interface 210, 220 needs to be aware of its own redundancy group A, B. Hence, in this case the CN network 200 may inform the radio interface 210, 220 about its redundancy group A, B; this can be done, for example e.g., during the Attach procedure in the Attach Accept message, or in a Tracking Area Update procedure in the Tracking Area Update Response message, or alternatively by Radio Resource Control (RRC) signalling from the BS 100 (e.g., when the UE measurements are set up). An exception is the case when the redundancy group A, B of a given radio interface 210, 220 is completely determined by the radio interface 210, 220 (e.g., UE) configuration and cannot be changed in the network 10; in that case the radio interface configuration is sufficient and no network information is needed to be sent to the radio interface 210, 220.

Figure 14:
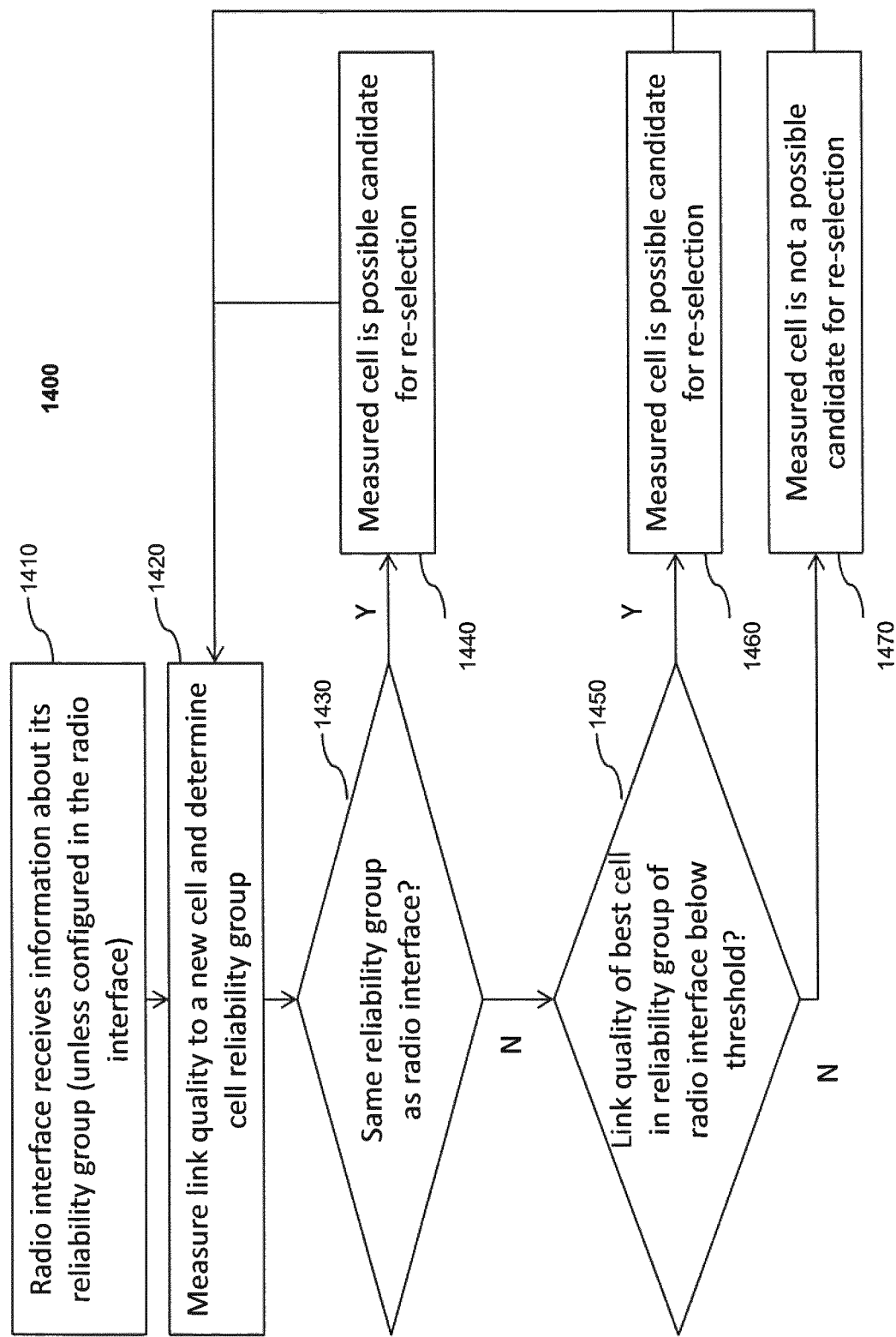
FIG. 14 is a flow diagram illustrating a still further method embodiment of the present disclosure.

An example of the radio interface behaviour for down-prioritizing cells in other redundancy groups A, B is illustrated in FIG. 14. The threshold in idle mode might not need to be identical to the one used in connected mode. Just as in connected mode, also in idle mode there could be other criteria that are also considered for selecting cells, which remain applicable.

In flow diagram 1440 of FIG. 14, in step 1410 a particular radio interface 210, 220 receives information (i.e., a grouping parameter) about its reliability group A, B (unless that information has already been previously configured in the radio interface 210, 220). In step 1420 the radio interface 210, 220 measures the link quality towards a new cell and determines the cell reliability group A, B. In step 1430 it is decided if the particular cell belongs to the same reliability group A, B as the measuring radio interface 210, 220. Should this be the case, the measured cell is identified as a possible candidate for re-selection and the method loops back to step 1420 for measuring link quality to another cell. Otherwise, or if all available cells have been measured, the method proceeds from step 1430 to step 1450, where it is determined if the link quality of the best cell in the same reliability group A, B of the radio interface 210, 220 is below a threshold. If this is the case, the method proceeds to step 1460, where the measured cell is identified as a possible candidate for re-selection. From step 1460 the method loops back to step 1420. If, on the other hand, it is determined in step 1450 that the link quality is not below the threshold, the method proceeds to step 1420, where it is determined that the measured cell is not a possible candidate for re-selection. From step 1470, the method will also loop back to step 1420.

b) BSs 100 do not broadcast the cell's redundancy group information as grouping parameter, or a radio interface 210, 220 is not capable of reading and interpreting such broadcast information.

In this case, radio interfaces 210, 220 in idle mode select a cell irrespective of the redundancy group A, B. Consequently, it may happen that a radio interface 210, 220 camps on a cell in another redundancy group A, B, and later on becomes connected to such a cell. In this case, connected mode mobility by the BS 100 is used to handover the radio interface 210, 220, using the handover controller 400, to another cell in the same redundancy group A, B whenever a suitable target cell (whose link quality is above a threshold) in the redundancy group A, B of the radio interface 210, 220 is available. This handover should be executed soon after the radio interface 210, 220 becomes connected. In this way the radio interface connectivity in another redundancy group A, B remains a transient, and the radio interface 210, 220 soon gets connected in its own redundancy group A, B. In case a suitable target cell cannot be found, and the system uses static redundancy grouping, the radio interface 210, 220 could be disconnected. For dynamic redundancy grouping, the radio interface 210, 220 may stay connected, since in this case it is allowed to use a cell in another redundancy group A, B once the own redundancy group A, B of the radio interface 210, 220 is not available with suitable coverage. This process is shown in FIG. 15.

Figure 15:
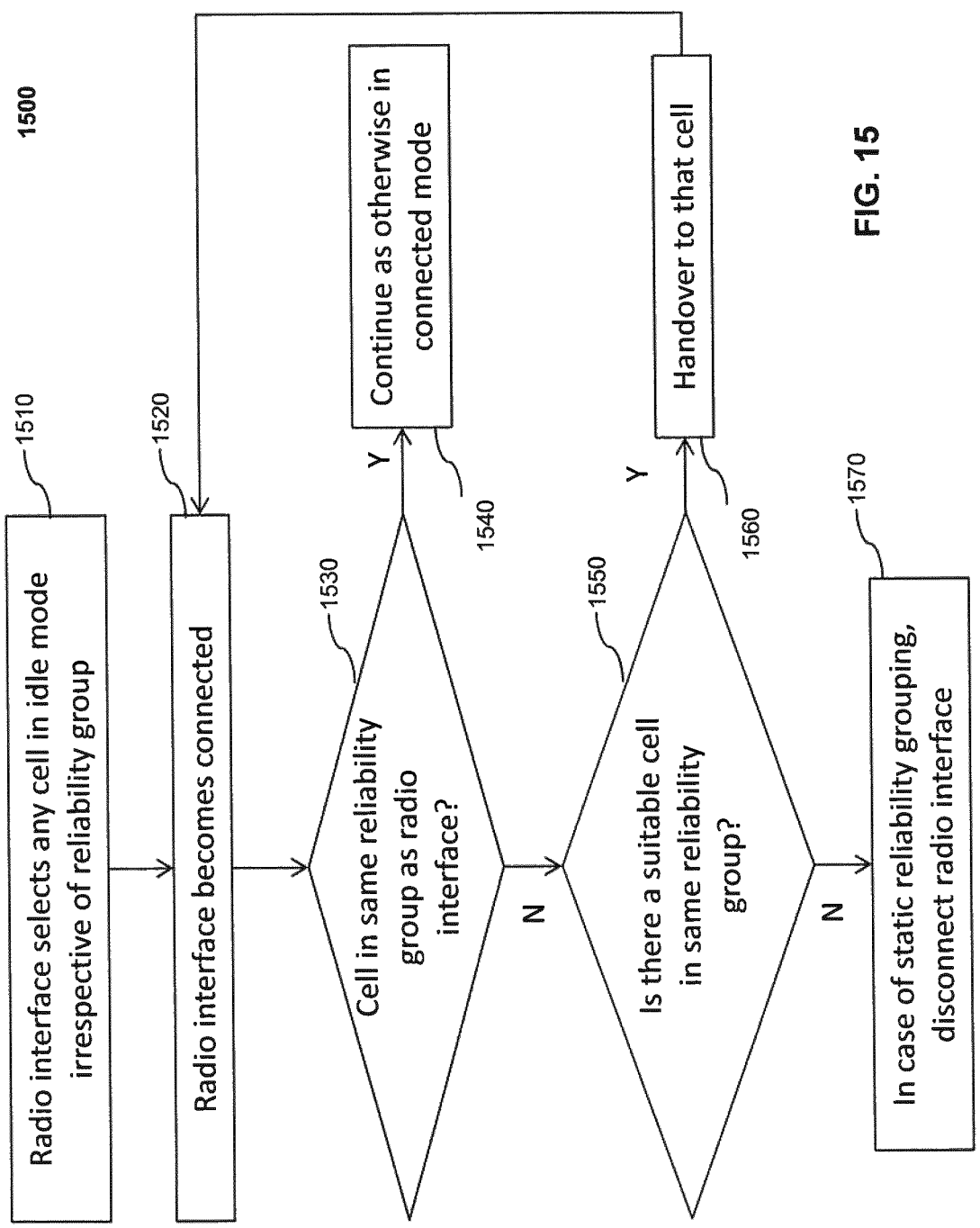
FIG. 15 is a flow diagram illustrating a further method embodiment of the present disclosure.

FIG. 15 illustrates a flow diagram 1500 of a further method embodiment that may at least partially be performed by the handover controller 300, the industry automation apparatus 20 or any other network component.

In step 1510, a radio interface 210, 220 selects any cell in idle mode irrespective of its reliability group A, B. In step 1520, the radio interface 210, 220 then becomes connected. In step 1530 it is determined if the cell selected in step 1510 belongs to the same reliability group A, B as the radio interface 210, 220. If this should be the case, the method continues in step 1540 as otherwise in connected mode. Should this not be the case, the method proceeds from step 1530 to step 1550 and determines if there is a suitable cell in the same reliability group A, B. The determination in step 1550 could, for example, be based on link quality measurements as explained above. If a suitable cell is found in step 1550, the method proceeds to step 1560 and performs, under control of the handover controller 400, a handover to that cell. From step 1560 the method loops back to step 1520. Otherwise, if it is determined in step 1550 that there is no suitable cell, the method continues to step 1570 where, in case of static reliability grouping, the radio interface 210, 220 is disconnected.

Just as in connected mode, it is also possible to use optimizations in idle mode in the radio interface 210, 220 for performing measurements (e.g., exclude or reduce the number of measurements in the frequencies used by other redundancy groups A, B as long as the current redundancy group A, B has cells with link quality above a certain threshold; or measure neighbour cells in other redundancy groups A, B less frequently as long as the current cells' link quality is sufficiently good). Such optimizations can be configured into the radio interface 210, 220 from the BS 100 before the radio interface 210, 220 is released to idle mode.

2.4 Dual Connectivity

Figure 16:
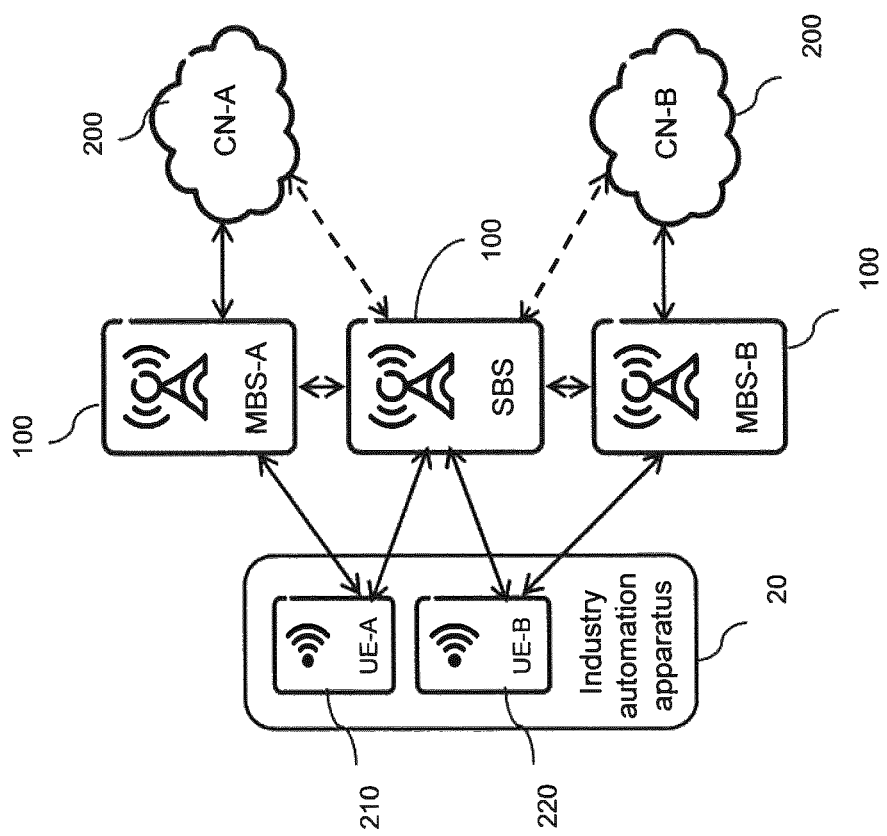
FIG. 16 is a schematic diagram illustrating a further connection embodiment of the present disclosure.

It is possible to deploy new radio cells in the network 10 not only for coverage reasons but also for system capacity improvements, where new cells can work in co-operation with other cells. In the case of dual connectivity, a radio interface 210, 220 of an industry automation apparatus 20 is simultaneously connected to two BSs 100: the Master BS (MBS, or MeNB in case of LTE) and the Secondary SBS (SBS, or SeNB in case of LTE) as shown in FIG. 16. Control plane (RRC) signalling between the radio interface 210, 220 and the RAN takes place at the MBS, just as control plane signalling between the RAN and the CN 200. However, the user plane may pass through the SBS, and it is also possible to use split bearers where the user plane goes via both the MBS and the SBS. It is the MBS that is in control of allocating SBSs for a given radio interface 210, 220.

The allocation of SBSs will also observe the redundancy groupings. An MBS may add a SBS only if it has cells that belong to the given redundancy group A, B of the given radio interface 210, 220. However, it may be possible to allow the cells of a SBS to belong to multiple redundancy groups A, B as well. That is because the loss of a secondary cell does not in itself lead to a loss of the RAN connectivity, i.e., a secondary cell is not a point of failure in itself. Therefore, it can be possible for UE-A and UE-B within the same industry automation apparatus 20 to both also use the same cell at a SBS, while they are connected to MBS-A and MBS-B, which are separate, as shown in FIG. 16. Even if the SBS fails, UE-A and UE-B can both continue to operate using their respective master cells. The use of the SBS may be advantageous, as it can improve the overall system capacity.

The MBS and SBS roles can be dynamic roles that are determined on a per radio interface basis for industry automation apparatuses 20. It may be possible that the same BS 100 is sometimes acting as a MBS for one radio interface 210 and a SBS for another radio interface 220. For that reason, the redundancy group membership for a given BS 100 should be given separately depending on whether it plays MBS role or SBS role. Accordingly, whenever a BS 100 notifies its neighbouring BSs 100 about its redundancy group membership, the BS 100 may indicate its redundancy group membership separately (as grouping parameter) for the master role and separately for the secondary role. As an example, it can be possible to configure all BSs 100 to be members of all redundancy groups A, B for the secondary BS role, while they are members of only one of the redundancy groups A, B for the master BS role. Such configuration could also be regarded as a default setting if no other configuration is given, i.e., even if a BS 100 is a member of only one redundancy group A, B, it could still be considered to be a member of all redundancy groups A, B for the secondary BS role.

3. Network Servers with No Support for Duplicate Paths

The above discussion has focused on two industry automation apparatuses 20 connected over a communication network 10 with two independent paths. In case of communication between an industry automation apparatus 20 and a (e.g., fixed) network server (e.g., within the CN or another network such as the internet), it is also possible to apply the same principles in case the server has dual connectivity over two communication interfaces.

In case of fixed network servers that have only a single connectivity, it is possible to apply a proxy node in the (e.g., cellular) access network or another network portion such that there are duplicate paths between an industry automation apparatus 20 and the proxy, and a single path between the proxy and the network server. This model provides protection only in the access network between the industry automation apparatus 20 and the proxy, but can be used also for network servers that have not support for duplicate paths.

For all of the above embodiments, it is not the scope of the present disclosure to define how the communication paths (i.e., connections) are monitored, how a failure is detected and how the switching from the working to the protection path is performed. Several solutions are available for monitoring (e.g., in Y1731 OAM functions and mechanisms for Ethernet-based networks), while Ethernet Automatic Protection Switching (EAPS) is an example for how the path or connection switching can be done in case of a failure. The duplicated frame transmission in PROFINET is handled by the industry automation apparatuses (PLC and IO devices) without any network level requirement and can also be implemented in this manner in embodiments of the present disclosure.

Many advantages of the present invention will be fully understood from the foregoing description, and it will be apparent that various changes may be made in the form, construction and arrangement of the steps, units and devices described above and without departing from the scope of the invention or without sacrificing all of its advantages. Since the invention can be varied in many ways, it will be recognized that the invention should be limited only by the scope of the following claims.

The invention claimed is:

1. A network controller configured to control a redundant connection of an industry automation apparatus having a first radio interface and a second radio interface via a communication network to another apparatus, the communication network comprising two or more functionally equivalent network entities grouped in a first network entity set and a second network entity set disjoint to the first network entity set, wherein the first network entity set and the first radio interface are associated with a first redundancy group and wherein the second network entity set and the second radio interface are associated with a second redundancy group, the network controller comprising:
   processing circuitry;
   memory containing instructions executable by the processing circuitry whereby the network controller is operative to:
      connect the first radio interface, in response to determining that the first radio interface belongs to the first redundancy group, via the first network entity set to the other apparatus;
      connect the second radio interface, in response to determining that the second radio interface belongs to the second redundancy group, via the second network entity set and in parallel to the first radio interface to the other apparatus;
      receive first control information associating the first radio interface with the first redundancy group;
      receive second control information associating the second radio interface with the second redundancy group;
      control the first radio interface based on the received first control information to be connected via the first network entity set; and
      control the second radio interface based on the received second control information to be connected via the second network entity set.

2. The network controller of claim 1, wherein the instructions are such that the network controller is operative to dynamically configure the first network entity set and the second network entity set.

3. The network controller of claim 2, wherein the dynamic configuring comprises dynamically reducing the redundancy by connecting the first radio interface and the second radio interface via the same first network entity or the same second network entity to the other apparatus.

4. The network controller of claim 1, wherein the instructions are such that the network controller is operative to determine that the first radio interface belongs to the first redundancy group and that the second radio interface belongs to the second redundancy group based on an order in which the first radio interface and the second radio interface connect to the communication network.

5. The network controller of claim 1, wherein the instructions are such that the network controller is operative to determine that the first radio interface belongs to the first redundancy group and that the second radio interface belongs to the second redundancy group based on one or more of:
   a first grouping parameter associated with the first redundancy group and signaled by the first radio interface and a second grouping parameter associated with the second redundancy group and signaled by the second radio interface;
   a network identifier associated with the first radio interface and the second radio interface, respectively;
   a cell selection scheme that defines cells selectable or not selectable by a particular radio interface for being connected to the communication network; and
   first and second Closed Subscriber Groups associated with the first radio interface and the second radio interface, respectively.

6. The network controller of claim 1, wherein the instructions are such that the network controller is operative to assign the network entities to the network entity sets.

7. An industry automation apparatus configured to be redundantly connected via a communication network to another apparatus, the communication network comprising two or more functionally equivalent network entities grouped in a first network entity set and a second network entity set disjoint to the first network entity set, the industry automation apparatus comprising:
   a first radio interface configured to connect to the communication network, wherein the first network entity set and the first radio interface are associated with a first redundancy group;
   a second radio interface configured to connect to the communication network in parallel to the first radio interface, wherein the second network entity set and the second radio interface are associated with a second redundancy group;
   wherein the industry automation apparatus is configured to receive first control information associating the first radio interface with the first redundancy group;
   wherein the industry automation apparatus is configured to receive second control information associating the second radio interface with the second redundancy group; and
   processing circuitry configured to:
      control the first radio interface to be connected via the first network entity set to the other apparatus;
      control the second radio interface to be connected via the second network entity set to the other apparatus;
      control the first radio interface based on the received first control information to be connected via the first network entity set; and
      control the second radio interface based on the received second control information to be connected via the second network entity set.

8. The industry automation apparatus of claim 7, wherein the at least one controller is configured to:
   control the first radio interface to signal to the communication network a first grouping parameter associated with the first redundancy group; and
   control the second radio interface to signal to the communication network a second grouping parameter associated with the second redundancy group.

9. The industry automation apparatus of claim 8, wherein:
   the first grouping parameter is one of defined by and derived from a network identifier associated with the first radio interface; and
   the second grouping parameter is one of defined by and derived from a network identifier associated with the second radio interface, respectively.

10. The industry automation apparatus of claim 7, wherein:
   a first Closed Subscriber Group (CSG) is associated with the first redundancy group; and
   a second CSG is associated with the second redundancy group.

11. The industry automation apparatus of claim 7, wherein:

the first network entity set comprises one of one or more first cells and one or more first base stations defining the first cells; and the second network entity set comprises one of one or more second cells and one or more second base stations defining the second cells.

12. The industry automation apparatus of claim 11, wherein:

the at least one controller is configured to control the first radio interface and the second radio interface based on a cell selection scheme that defines cells selectable or not selectable by a particular radio interface for being connected to the communication network.

13. The industry automation device of claim 7, wherein the industry automation device is configured to:

receive, from the first network entity set, third control information indicative of the first network entity set belonging to the first redundancy group;

receive, from the second network entity set, fourth control information indicative of the second network entity set belonging to the second redundancy group; and wherein the processing circuitry is configured to:

control the first radio interface based on the received third control information to be connected via the first network entity set; and control the second radio interface based on the received fourth control information to be connected via the second network entity set.

14. The industry automation apparatus of claim 12, wherein the cell selection scheme is based on Tracking Areas (TAs).

15. The industry automation apparatus of claim 14, wherein the processing circuitry is configured to control the first radio interface and the second radio interface based on control information defining TAs not selectable for the respective radio interface.

16. The industry automation apparatus of claim 7, wherein the processing circuitry is configured to dynamically control the first radio interface to be connected via the second network entity set to the other apparatus or to control the second radio interface to be connected via the first network entity set to the other apparatus.

17. The industry automation apparatus of claim 16, wherein the processing circuitry is configured to perform the dynamic control based on an assessment of one or more metrics.

18. The industry automation device of claim 7, wherein the processing circuitry is configured to select a network entity from the first network entity set and a network entity from the second network entity set for the first radio interface and the second radio interface, respectively, based on one or more metrics.

19. A method of controlling a redundant connection of an industry automation apparatus to another apparatus via a communication network, the industry automation apparatus having a first radio interface and a second radio interface to another apparatus, the communication network comprising two or more functionally equivalent network entities grouped in a first network entity set and a second network entity set disjoint to the first network entity set, wherein the first network entity set and the first radio interface are associated with a first redundancy group, and wherein the second network entity set and the second radio interface are associated with a second redundancy group, the method comprising a network controller:

connecting the first radio interface, in response to determining that the first radio interface belongs to the first redundancy group, via the first network entity set to the other apparatus;

connecting the second radio interface, in response to determining that the second radio interface belongs to the second redundancy group, via the second network entity set in parallel to the first radio interface to the other apparatus;

receiving first control information associating the first radio interface with the first redundancy group;

receiving second control information associating the second radio interface with the second redundancy group;

controlling the first radio interface based on the received first control information to be connected via the first network entity set; and controlling the second radio interface based on the received second control information to be connected via the second network entity set.

* * * * *